United States Patent [19]

Fraser

[11] 3,954,231
[45] May 4, 1976

[54] CONTROL SYSTEM FOR FORWARD WING AIRCRAFT

[76] Inventor: Norman T. L. Fraser, 4597 Candleberry Ave., Seal Beach, Calif. 90740

[22] Filed: June 16, 1975

[21] Appl. No.: 587,364

Related U.S. Application Data

[63] Continuation of Ser. No. 504,680, Sept. 9, 1974, abandoned.

[52] U.S. Cl................... 244/83 C; 244/45 A; 244/83 R; 244/90 R
[51] Int. Cl.² .................................. B64C 13/04
[58] Field of Search................ 244/45 R, 45 A, 46, 244/48, 35 R, 83 R, 83 C, 90 R; D12/71, 77, 78, 80

[56] References Cited
UNITED STATES PATENTS

| | | | |
|---|---|---|---|
| 1,886,932 | 11/1932 | Anderson | 244/83 C |
| 1,936,786 | 11/1933 | Gebhert | 244/45 R |
| 2,082,172 | 6/1937 | Mignet | 244/83 C |
| 2,363,550 | 11/1944 | Reichert | 244/45 R |
| 2,430,793 | 11/1947 | Wells | 244/45 R |
| 2,681,776 | 6/1954 | Howard | 244/45 A |
| 2,747,816 | 5/1956 | Howard | 244/83 R |
| 2,773,659 | 12/1956 | Feeney | 244/83 R |
| 3,155,344 | 11/1964 | Vogt | 244/83 R |
| D129,548 | 9/1941 | Rocheville | D12/71 |
| D234,079 | 1/1975 | Whitever | D12/77 |

FOREIGN PATENTS OR APPLICATIONS

| | | | |
|---|---|---|---|
| 620,149 | 4/1927 | France | 244/45 R |
| 789,619 | 11/1935 | France | 244/45 R |

*Primary Examiner*—Duane A. Reger
*Assistant Examiner*—Galen L. Barefoot

[57] ABSTRACT

This invention relates to the arrangement of lifting, stabilizing, and flight controlling, wing surfaces, placed near the front of an aircraft, with main lifting wing surfaces, placed toward the rear. Control surfaces placed rearwardly on the aft fuselage and/or the rear main lifting wing surfaces, are also indicated.

12 Claims, 37 Drawing Figures

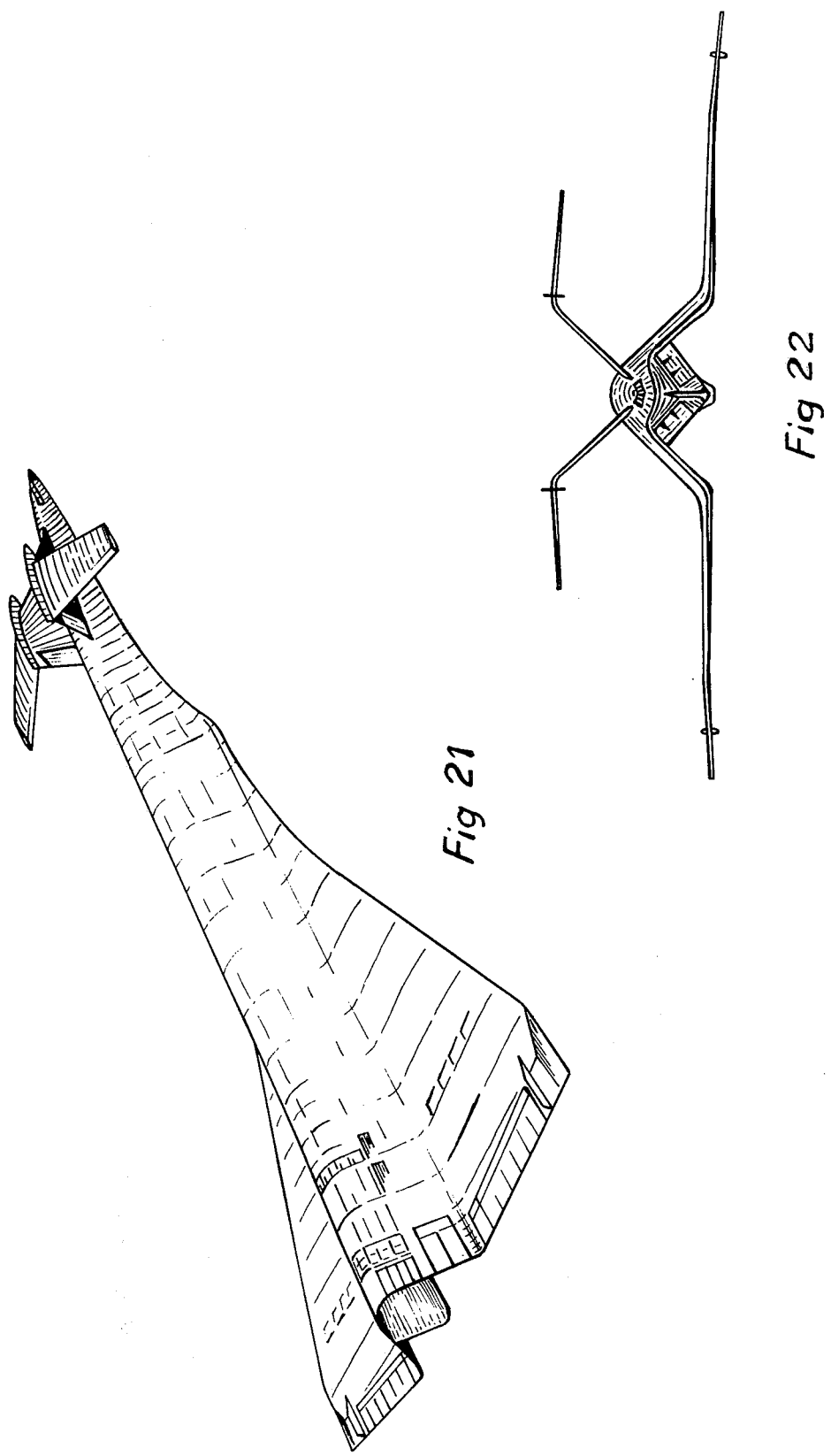

CONTROL SYSTEM FOR FORWARD WING AIRCRAFT

This is a continuation of Ser. No. 504,680, filed Sept. 9, 1974, now abandoned.

SUMMARY OF THE INVENTION

Most aircraft in use are designed with the main wing surfaces forward of the rearwardly placed tail surfaces or empennage. Recently designed conventional aircraft have very large tail areas, which give a negative lift condition at the rear of the aircraft, during most of the takeoff, flight and landing, but still only permits a rather limited, permissible center of gravity movement, under all required operating conditions. This may be acceptable for a passenger-carrying aircraft, but not adequate for a true freight-carrying aircraft. Pilot feel when sitting high up in a long, deep fuselage, is difficult to determine with the rear fuselage tail, actuating the forward fuselage, about the main wing, while in flight. The conventional aircraft is vulnerable to tipping backwards about its landing gear, while loading, as freight is moved rearwardly along the fuselage.

Takeoff and landing requires negative tail lifting, which adds to the main forward wing loading, at a time when this condition is least desirable. Tail bumping on the runway is another of today's conventional aircraft problems. Conventional aircraft carrying the aircraft weight by the main wing in flight at approximately the half-length of the fuselage, gives cause to large fuselage and wing bending moments at an in-flight gust condition. "Deep Stalls" are caused by the tail of a conventional aircraft, be it high up on the vertical stabilizer or fin, or placed at the fuselage level, or somewhere in between both, being made ineffective at high angles of attack, by the blanketing effect of the forward main lifting wing surfaces. Most conventional, large aircraft also have a very complex leading edge, and trailing edge, slat and flap arrangement, on the main wing surfaces, which requires much maintenance, are costly items to manufacture, and are also heavy items.

It is accordingly an object of my invention to remove the deficiencies of the aforementioned designs and for this purpose, the details of my invention are here disclosed.

An aircraft with unique forward, positive lifting, flight and ground controlling wing surfaces, forward of the aircraft center of gravity, with the main lifting surfaces, also containing control surfaces, rearward of the new forward, smaller surfaces. A third set of control surfaces may be placed at the rear of the aircraft, attached to the main wing tips or trailing edge of the main wing surfaces, or rear fuselage, or a combination of both to assist with yaw control. Depending on the ratio of forward to main (rear) surfaces, wing areas used, the permissible range of aircraft center of gravity movement, as a percentage of the mean aerodynamic chord, of the main wing surface, is many times greater than that obtained with conventional types of aircraft. These new forward control surfaces, by their location, cannot be affected by any preceding surfaces' airflow, since they are the most forward wing surfaces.

The forward control surfaces being discussed, give pitch control, assist with, or perform, roll control, and the rudder action when actuated alone gives yaw control. Since the new forward wing surfaces, add to the aircraft main wing surfaces, in lifting the aircraft, reduced main (rear) wing loading, when compared to the conventional aircraft main (forward) wing loading, is achieved, which means that a reduced area may be used on the main rear surfaces. Enhanced rear main wing lift can be achieved, if engines are slung from the forward lifting and controlling wing surfaces, and by a correct relationship with the aft placed wing, create accelerated airflow over the aft main wing upper surface.

DESCRIPTION

The subject of my invention is found in the design of new forward lifting wing surfaces, mounted near the nose of an aircraft, forward of the aircraft center of gravity, and also forward of the aircraft main wing surfaces. The inner portion containing rudder and elevator capability, mounted near the nose, moves outwardly at a large dihedral angle, at each side of the fuselage, whereupon the span of these forward, wing surfaces, extend further outwardly at a slight anhedral angle, or may be horizontal, or dihedral may be used, with this lifting, or elevator outer portion, of the forward wing span, a suitable title for these surfaces being "Deep Gull Wing." The span of, or horizontal length of, the fuselage attached ruddered inboard portion, being approximately one-half that of the outboard elevator portion, but any suitable ratio of the inner and outer portions may apply. With regard to the inner dihedraled, forward wing surface, and the join with the outer elevator surface, this join or fold line may be parallel to the aircraft longitudinal centerline, but the fold line may move inboard or outboard, about the surface's leading edge as design may dictate. The total trailing edge of these forward placed wing surfaces (see sketches for different versions) is hinged to act as control surfaces, capable of up and down movement. The dihedraled portion is set at a suitable dihedraled angle, and the trailing edge hinged controls, may also move differentially, which action then gives a rudder, or yaw control. It is further pointed out that in some versions of the design, the total trailing edge controls may be moving up and down in unison, as required, as a single unit, and at any trailing edge deflected position, the inner dihedraled portion, trailing edge controls, may be actuated differentially, to give rudder, or yaw control to the aircraft. In like manner, the inner dihedraled portion may be actuated differentially to give rudder control, and at any given rudder control position, the elevator control may be superimposed upon the rudder control effects, without nullifying the previous control. Because of the large dihedraled portion of the total forward lifting elevator control, very favorable stalling characteristics for these total forward lifting and controlling surfaces are obtained, and constitute another substantial advantage for these control surfaces. The stall for such a total lifting surface area is approached by increasing the angle of attack of the total surfaces. The outer elevating wing portions stall (non-ruddered portion); then the remaining inboard dihedraled portion by its characteristics, stall at a greater angle of attack, but owing to the stalled outer portion of greater area, cannot of themselves sustain the same degree of lift, the angle of attack is smoothly reduced, and lift is again regained by the outer, or total forward wing surface area. This recovery is achieved without any rolling movement, of the total aircraft.

This desirable action is attributed to the large dihedraled portion of the total forward lifting surfaces, plus the stabilizing action of the so designed, non-stalled main, rearwardly placed wing surfaces. Rudder action of the forward surfaces is such that an in-flight turn generates a rolling movement to the fuselage complementary to the action of the normal aileron movement, developed on the rearwardly placed main plane surfaces, during a banking turn.

Since the main wing is rearward of the half-length of the fuselage, assistance to the main wing aileron action is achieved by the innate characteristics of the forward, dihedraled, ruddered, inner surfaces, of the forward lifting elevator, as previously mentioned. In addition, by having differential, or aileron control, added to the forward outer section, controls (see FIGS. 26, 28, 30, 32, 33, 35), which also perform normal elevator control actions (see sketches). Fuselage torquing or twisting can be reduced, by this addition to this design, with an attendant weight saving, in the fuselage structure. The plan view of the new, herewith being disclosed, forward wing surfaces, may be of straight wing, swept wing, or of single or double delta, or swept forward design, where the total leading edge may be swept forward, or only the inboard ruddered portion leading edge may be swept forward, with the outer portion swept rearwardly, or a combination of the foregoing designs, to mention but a few suitable design possibilities.

The new forwardly placed wing surfaces may be set high by their own design characteristics (see sketches) with a forward fuselage designed to accommodate same, and in particular by the dihedraled, ruddered portion, which then raises the forward lifting elevator portion, high above the rearwardly placed, main wing surfaces. The rearwardly placed main wing surfaces, may be of low wing configuration, or midwing, or high wing design, of any suitable plan form. The leading edge of the new forward wing surfaces, may employ leading edge stabilizing slats, but the excellent stalling characteristics of these new forward wing surfaces, would largely nullify their need. Since the forward surfaces are designed to stall before the rearwardly placed main wing surfaces, no leading edge devices may be required on the rearwardly located main wing (except in the case of fighter aircraft), and only a simple trailing edge flap system may be required on the rearwardly located main wing surfaces.

This rearwardly placed main wing surface's trailing edge flaps, may be capable of actuation from neutral, or in line with the wing section, to that of a regular trailing edge flap, deflected down, on the trailing edge flap area may be deflected up to reduce lift, in conjunction with, or simultaneously arranged, similar movements of the forward wing surfaces. The main rear wing ailerons may have flap capability also. Trailing edge controls of the new forward placed lifting surfaces, may be of simple hinge design or of high lift design. The total forward surface may be of fixed incidence design, or the total surface area may have a variable incidence capability (see sketches). Another possibility is that of a fixed incidence dihedraled portion, with say the outer elevator surfaces having a means of varying the incidence of same, equally on each side (see sketches) or differentially, or both. The inner dihedraled, ruddered portion of the forward lifting wing surfaces (all versions) has a lift capability at all times. During normal flight, when the rudder action is actuated, this complements the main rearwardly placed wing aileron control, in banking the aircraft during an in-flight turn, as previously mentioned.

The following rearwardly placed rudder capability is not a requirement with my design, but definite advantages to providing a fixed or retractable aft rudder capability, are discussed. An additional rudder or rudders, or fin and rudder, or fins and rudders, may also be employed, on the rear main wing or rear fuselage, rearward of the aircraft center of gravity (see FIG. 1 for retractable rudder illustration), in separate or in combined use, with the forward, rudder action, here being described. The rearwardly placed rudder(s) may be used to assist with a radiused turn of the aircraft, or the rearward placed rudders may be set to turn the rear end of the aircraft moving in the same direction as the forward rudder action, which would be useful for lining up the aircraft correctly on a parallel course with the runway while in flight, or permit "side slips" in normal flight. This side slipping capability could, for future very large aircraft, with much inertia, be a distinct control advantage over the accepted singularly placed, rudder or rudders. The side slipping capability, with an equal ability for the aircraft to gain altitude and lose altitude in flight, by the simultaneous movement of forward and rear wing surfaces controls, will be a distinct design requirement of future aircraft, with particular reference to fighter aircraft! The speed range for an aircraft employing my proposed, improved aerodynamic surfaces, may range from slow speed, subsonic, to supersonic and multiple sonic speed ranges. The invention may apply to small light aircraft to the largest of aircraft. Another advantage of this design is the lifting action of the forward smaller wing surface being described. At takeoff, the elevating action of the forward surface area, adds to the rear main wing lift. With the placing of the forward lifting wing surface up front, on the fuselage, and with the main wing lifting effort rearwardly of the center of the fuselage length, this gives an almost ideal fuselage bending moment condition, achieved at say an in-flight gust condition (when compared to the conventional forward placed main wing surface), where the forward lifting wing surface, accepts its portion of the aircraft load, and then the main wing accepts its share of the total aircraft loading. The aforementioned fuselage and wing bending moment reduced loadings, contribute considerably to weight saving, with my proposed new design. Certain future aircraft will possibly use atomic power as an energy source. A design already proposed by more than one aircraft engine manufacturer, shows engines grouped together with the atomic heat source close at hand, a natural condition for an aircraft with forward lifting, elevating, control surfaces as previously described, which would readily use the rear fuselage, or rear main wing, for rearwardly placed, atomic power unit location. Also proposed individual atomic heat cells for each engine, fits in with the above proposal. My forward lifting surfaces, have a fail-safe advantage inherent in the design, when compared to say a single high set large area fin and rudder with large area and span, elevator, atop same. My design may suffer, say by midair collision, a failure of some fixed structural component or moving surface, but the comparable portion on the other side of the aircraft axis of symmetry, may be unimpaired, to return the aircraft for a safe landing. Any suitable airfoil section may be employed for my forward lifting surface design. The airfoil may vary for the dihedraled portion, and then employ, further variations of airfoil as the elevator portion moves outboard. The selection of airfoil sections with an innate, nose down pitching moment, may be most suitable for the new forward wing section, while selection of say a symmetrical or reflexed airfoil with neutral or nose up pitching moment, may be employed on the rear main wing surface, where the stall characteristics are not of such importance, owing to the innate nonstalling main wing design, of this aircraft configuration, as previously described. An adaptation of the relatively new super critical wing sections, looks very promising for certain versions of my new design. The moment characteristics of the above mentioned airfoils, applied to the forward lifting elevator, aircraft fuselage, assists in reducing the fuselage and main, rear wing bending moments, when compared to the conventional aircraft fuselage and wing bending moments, and again further assists with the reduction, of total aircraft weight.

To clearly understand this invention, attention will now be given to numerous embodiments of the invention, with reference to accompanying drawings.

BRIEF DESCRIPTON OF THE DRAWING

FIG. 1 is a perspective view of an aircraft utilizing a version of FIGS. 23, 24, 25 or 26 type of forward lifting elevator, embodied, in the aircraft design, showing one version of the invention. Also shown, but not detailed, is a retractable rear rudder.

FIG. 2 is a perspective view of a large aircraft utilizing a version of FIGS. 27, 28, 29 or 30, type of forward lifting elevator, embodied in the aircraft design. Discernible in the sketch are the external wing stiffeners. This structural design leaves the internal wing section available for cargo or fuel. Fuselage space is also available for cargo.

FIG. 3 shows rear main wing section of FIG. 2 aircraft, with four international standard containers, side by side, inside this rearward placed wing section. This airfoil section is designed to have a maximum thickness chord ratio acceptable for high speed flight.

FIG. 4 is a perspective view of an aircraft utilizing a version of FIGS. 27, 28, 29 or 30, type of forward lifting elevator. This trifuselage aircraft, supports the outer removable or fixed fuselage units, over the rearwardly placed main wing surfaces, and also carries the outer fuselage bodies by pylons suspended from the forward lifting elevator. Any form of cargo may be carried, including liquids, and international standard containers. This aircraft is designed to carry including liquids, cargo and containers in the central fuselage also, and may be flown with the outer fuselage units removed. This is another distinct advantage with this design. The outer fuselage units may be designed to have a rapid removal and replacement capability as part of the overall design. Future hydrogen powered aircraft may use, say the fuselage for fuel tanks with passengers in the outer fuselage members, straight wing shown. Wings, fore and aft may be swept back, outboard of outer container attachments, or full swept wings forward and aft.

FIG. 5 is a perspective view of a large supersonic aircraft, with FIG. 29 or 30 type forward lifting elevator. Rearwardly located fins and rudders are set to complement the forward lifting elevator and rudder actions.

FIG. 6 is a perspective view, showing a multiple sonic speed fighter aircraft with a Mach 4 capability, for rapid transitional movements, without high "G" induced pilot conditions. Superior maneuverability with attendant short takeoff and landing characteristics, with FIG. 31 type, forward lifting, elevator, having a capability of direct up and down movement and also of direct side movements, or simultaneous above movements in flight (plus conventional airplane maneuvers, by forward elevation, etc.). These advantages are achieved by forward and rearward placed controls, acting simultaneously. Aft main wing outer portions may rotate, or the outer wing portion trailing edge hinged surfaces only, may be actuated, or a combination of both methods may be employed. The aft main wing inner trailing edge surfaces may also be actuated for further control possibilities (see FIG. 31 description for further details). The outer pods contain armaments, cannons, rotating cannon or missiles. The pod also forms a wing fence for outer portion rotational control movements, and this pod also contains outrigger wheels, when a bicycle fuselage landing gear is employed. The pods can be readily removed and replaced for area rule adjustments, for various externally carried equipment.

FIG. 7 is a perspective view of a short takeoff and landing aircraft (S.T.O.L.) using FIG. 32 type forward elevator. This aircraft's forward movement is by jet engines mounted on the forward lifting elevator wing, and also the rear wing, with trailing edge flaps on forward and rear surfaces acting simultaneously. Rudder and elevator control is by the dual function dihedraled, forward surfaces. A rear fin and rudder may be added. In this version, the forward wing outboard of the dihedraled, ruddered inner portion, and the aft wing, both with engines attached may be rotated approximately 90° to make aircraft capable of vertical takeoff and landing (V.T.O.L.) flight.

FIG. 8 is a perspective view of a short takeoff and landing aircraft, using a version of FIG. 32 type forward lifting elevators, and propelled by engine driven propellers or airscrews, for quiet operation, but jet engines may also be used, mounted on both forward and rear wings. The wing tips of both lifting surfaces are so designed to give maximum short takeoff and landing characteristics. The aft wing tips are turned down through approximately 45° and also have rudder action capability.

FIG. 9 is a perspective view of a large subsonic or supersonic aircraft, using FIGS. 27, 28, 29 or 30 type forward lifting elevator controls. Atomic energy, is intended as a jet engine recirculating heat source. Engines rearwardly placed.

FIG. 10 is a perspective view of a light aircraft with a fixed incidence version of FIG. 27 or 28 type forward, lifting elevator controls. Propeller or jet engine may be used for propulsion. The rear placed rudder may give radiused turns with the forward rudders, or move in the same direction as the forward rudders, for parallel side slipping maneuvers. Plus simultaneous fore and aft controls, may be used for direct up and down action, as previously mentioned in FIG. 6.

FIG. 11 is a perspective view of an amphibious multi-engined aircraft, using a version of FIGS. 29, 30 or 31 type forward lifting elevator. Two engines are shown attached to the forward surfaces. Any suitable number of engines may be used forward. The forward engines may be fixed to the dihedraled and ruddered portion, or the engines may be fixed to the variable incidence outer elevator surfaces. The forward and rear simultaneous lifting wing surfaces, gives a superior takeoff and landing, hull planing when compared to the conventional flying boat. The location of the forward placed engines is designed to give increased airflow velocity over the upper surfaces of the main lifting aft wing in flight. Two aft placed engines are shown in FIG. 11, but any suitable number of engines may be used. A much greater load lifting capacity may be achieved if the amphibious flying boat is held at a very low altitude, where a water surface effect can be used, rather than the pure wing surfaces lifting capability. Reduced speed is required to achieve this last mentioned forward movement.

The following FIGS. 15, 16, 17, 18, 19 and 20 are modifications of the invention.

Figure 1:
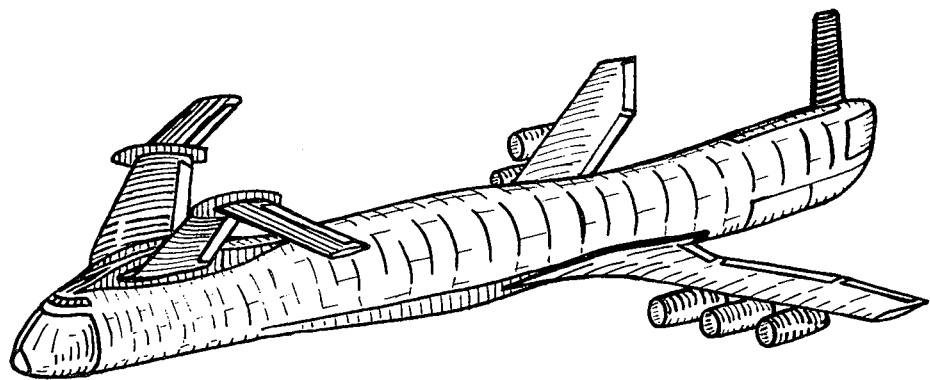
Figure 2:
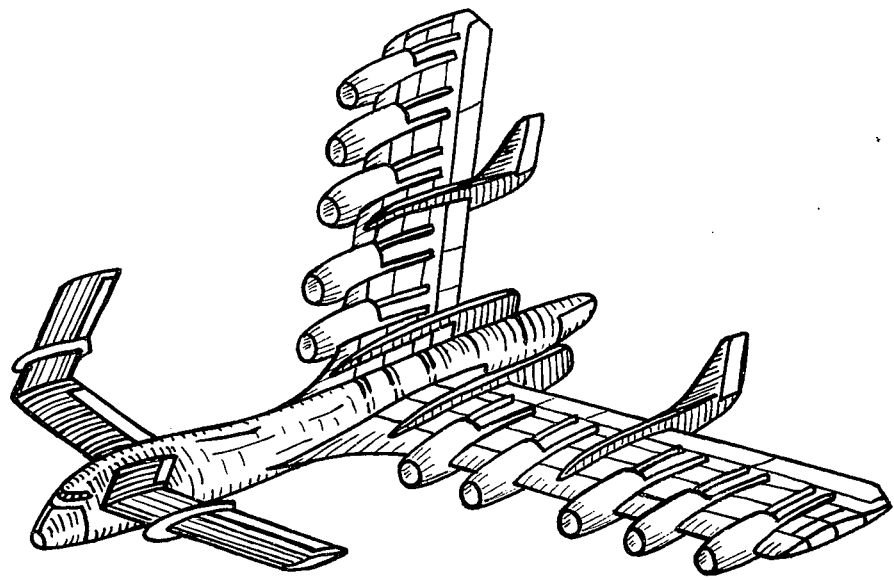
Figure 3:
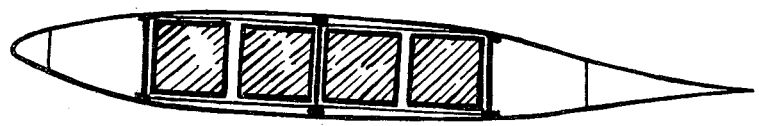
Figure 4:
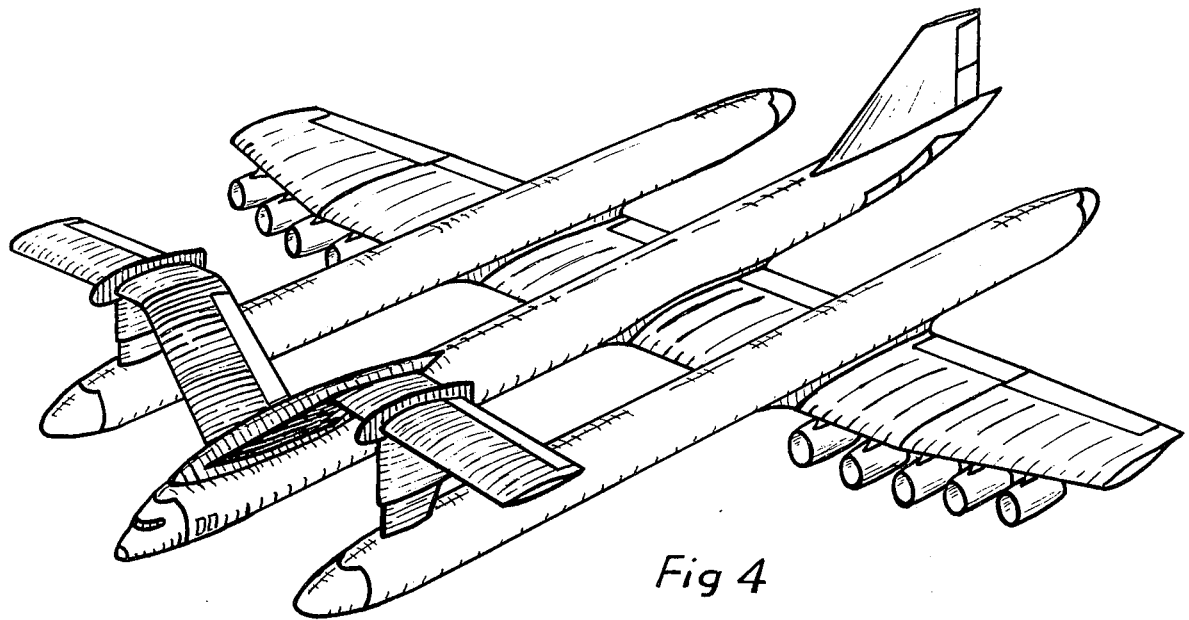
Figure 5:
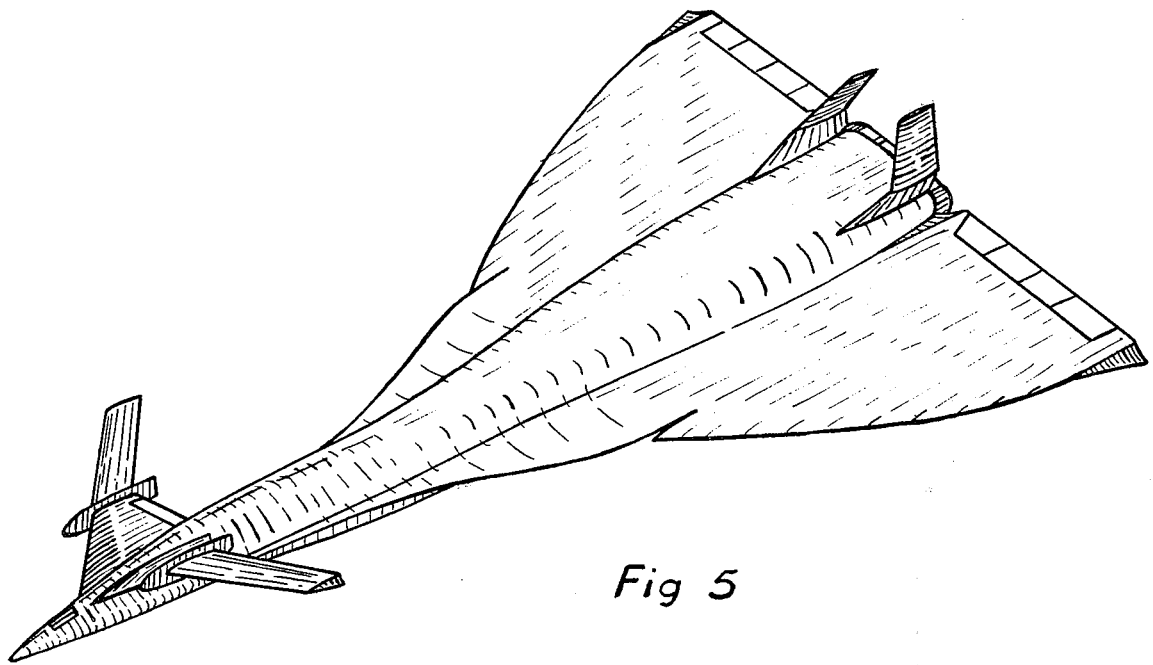
Figure 6:
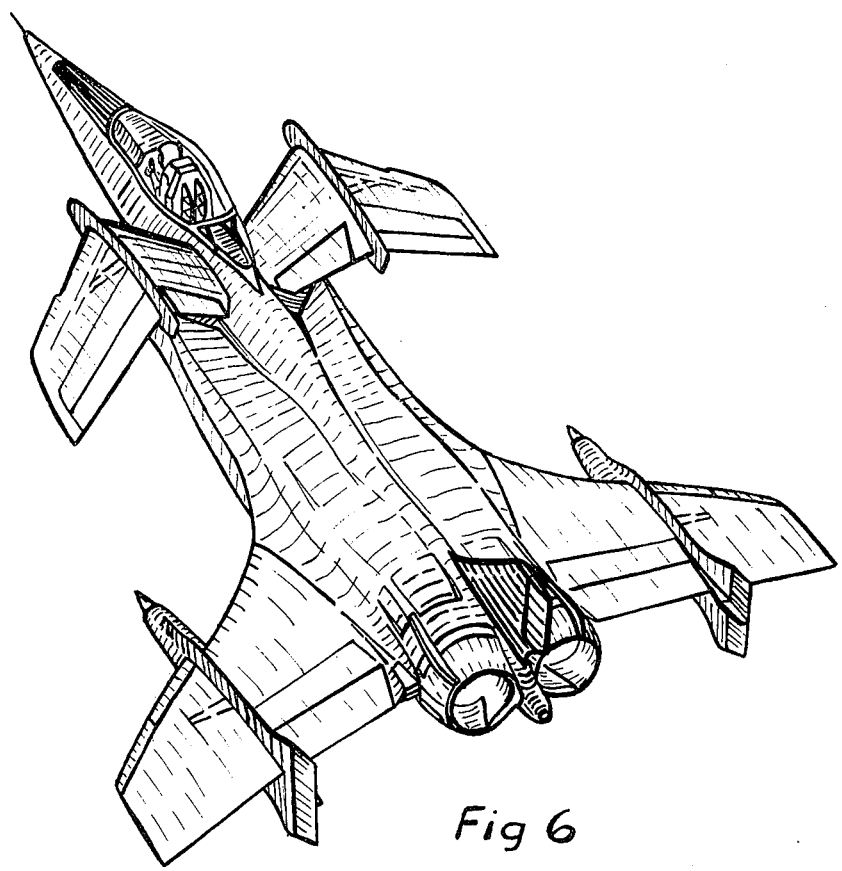
Figure 7:
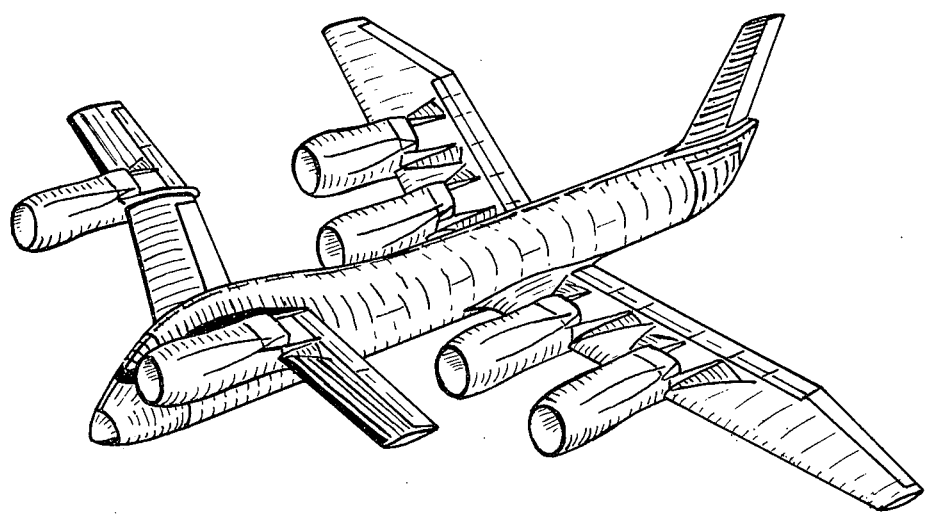
Figure 8:
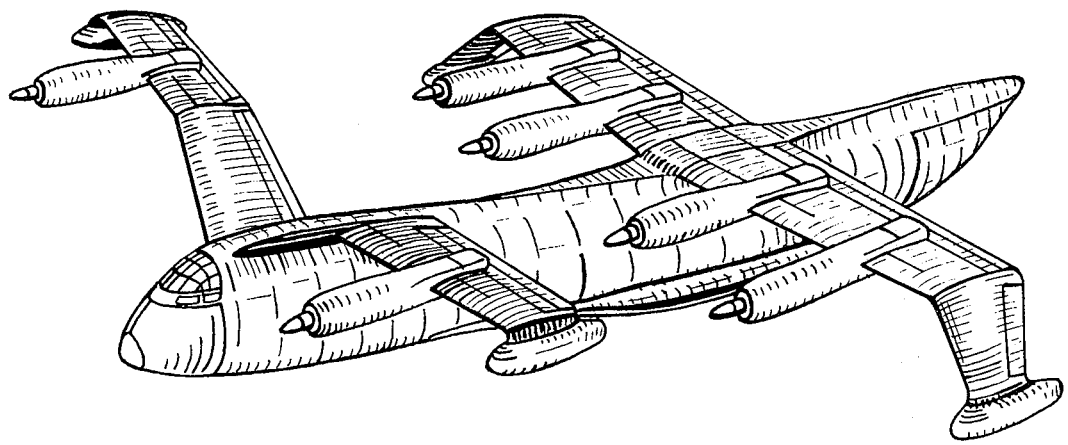
Figure 9:
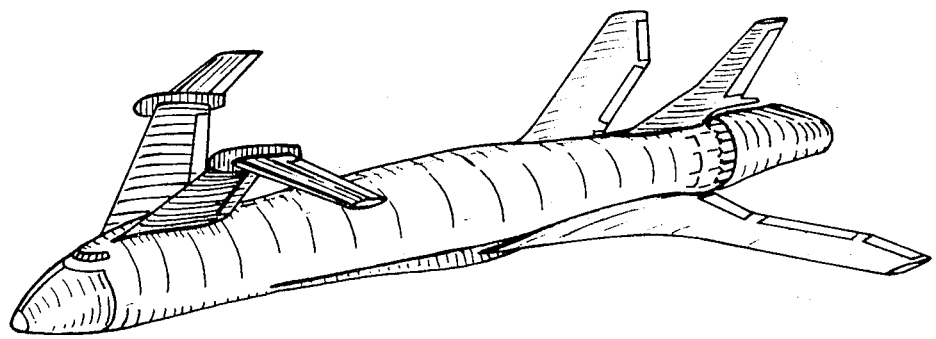
Figure 10:
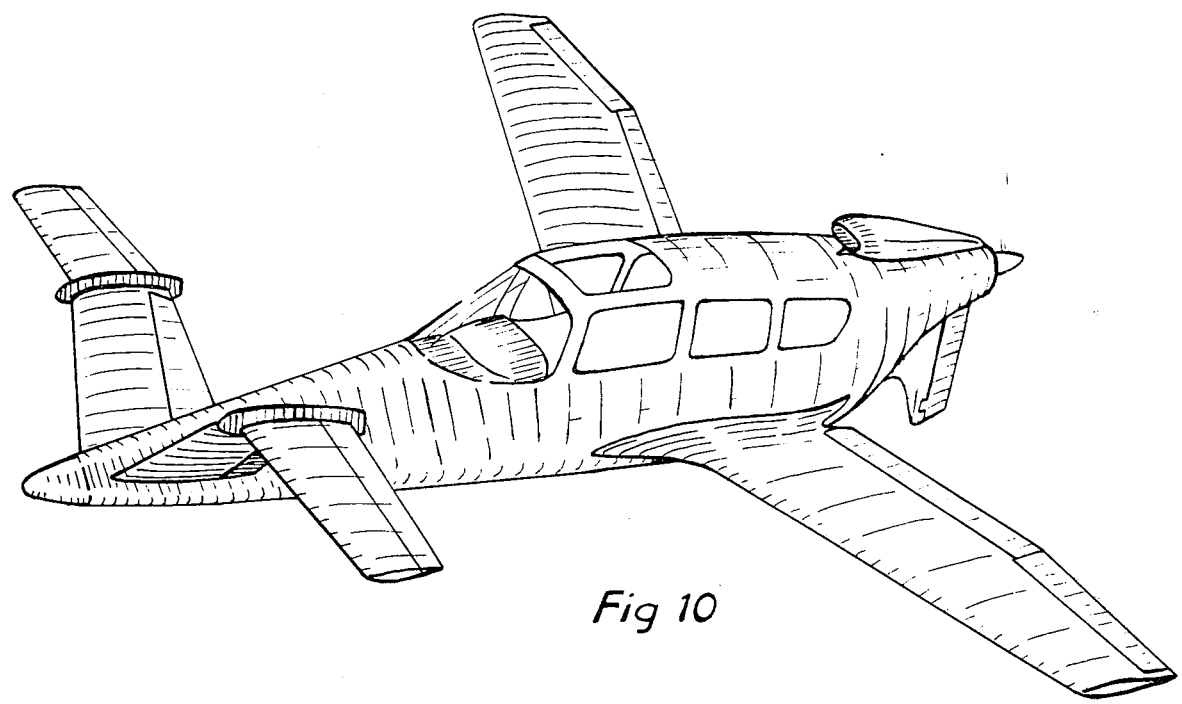
Figure 11:
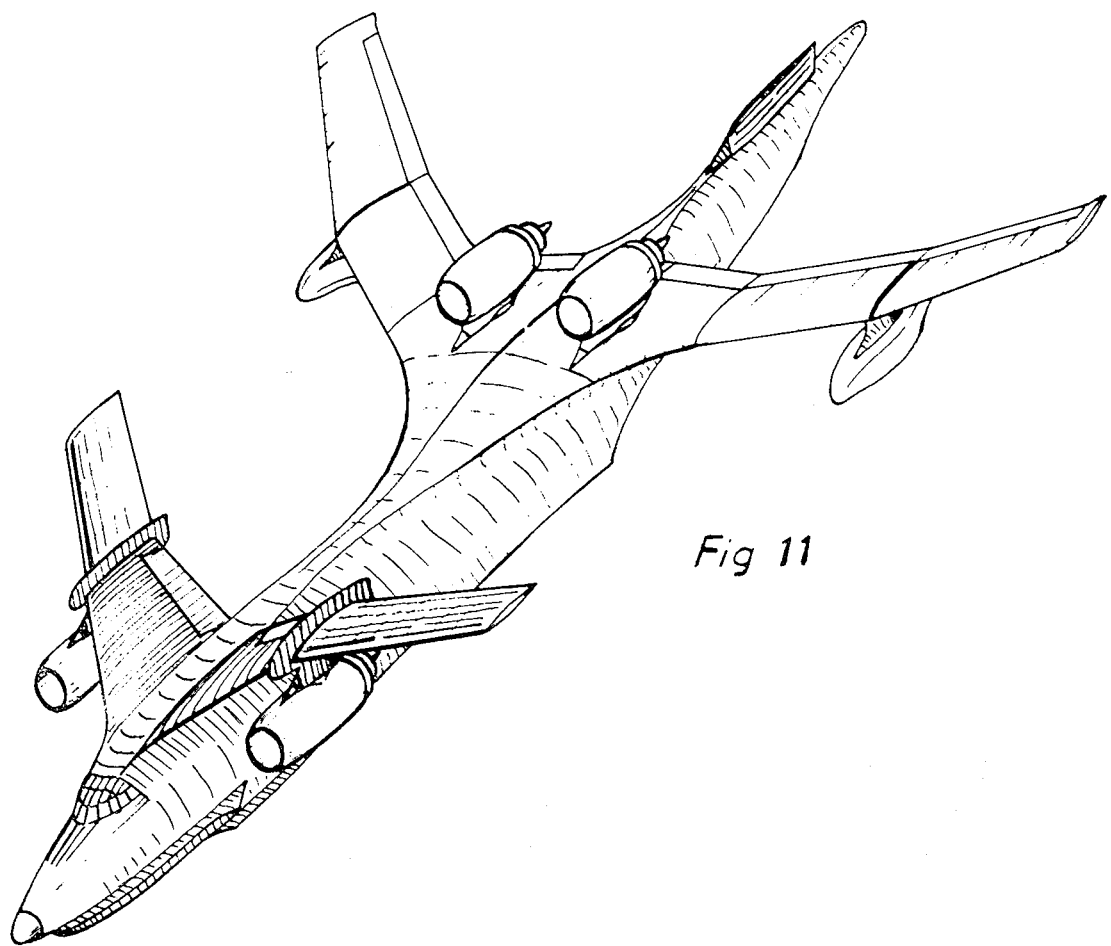
Figure 12:
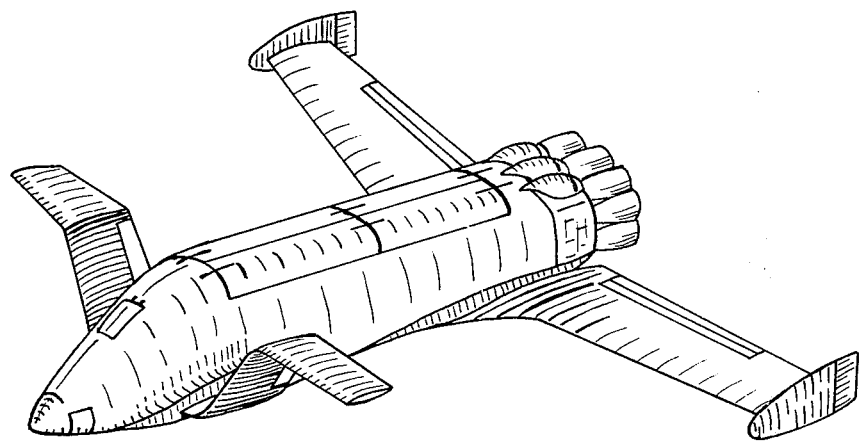
FIG. 12 is a perspective view of a reentry space vehicle, with forward lifting elevator, having a modified version of FIG. 25 forward lifting elevator, but without trailing edge movable surfaces on the outer elevator wing portion, but having a capabililty to rotate through approximately 90°, thickened trailing edge sections being added (details not shown).
Figure 13:
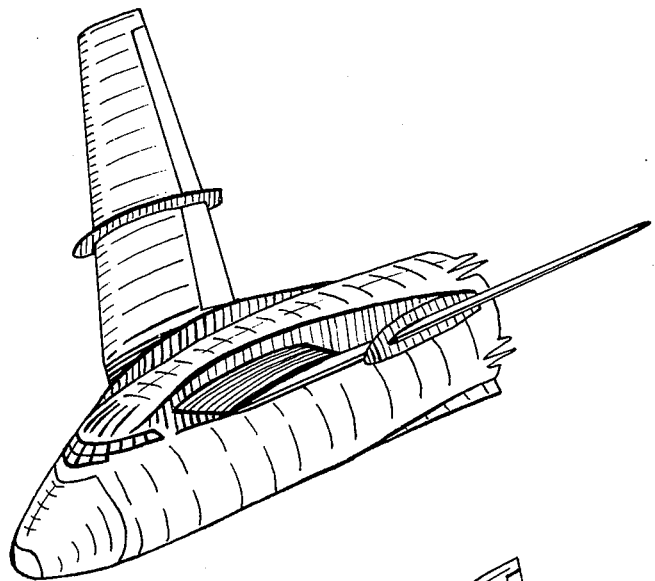
FIG. 13 and FIG. 14 are perspective views showing embodiments of FIGS. 23, 24, 25, 26, 27, 28, 29 and 30, respectively, but are modified to show the outer elevator portion, continuing outboard at appreciably the same dihedral angle as the ruddered inboard portion.
Figure 14:
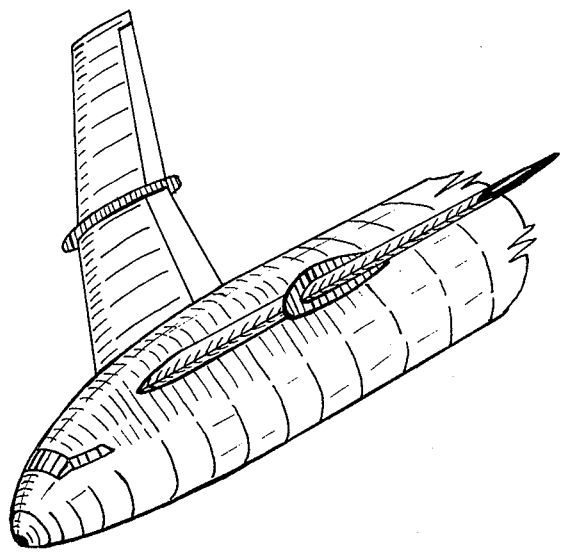
Figure 15:
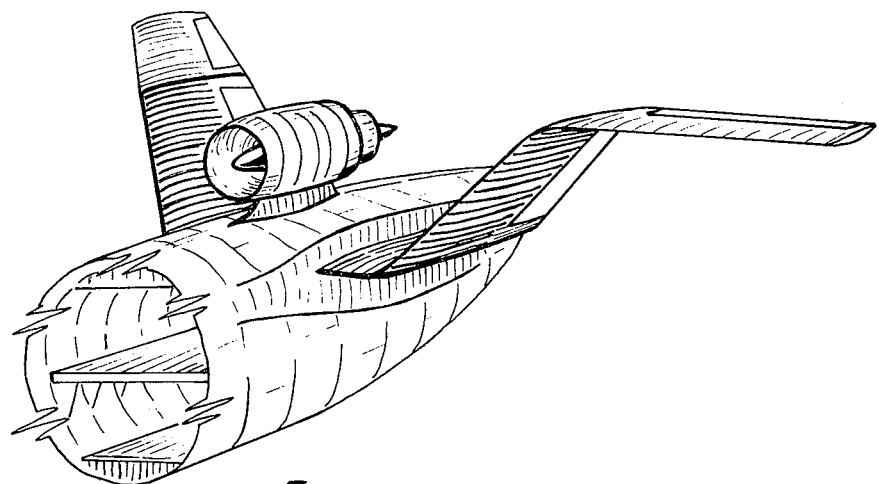

FIG. 15 is a perspective view of the rear of a conventional forward main wing aircraft, using FIGS. 23, 24, 25 and 26 movable surfaces installed in the rear of the aircraft. This version permits engine mounting at rear, with inlet efficiency comparable to wing mounted engines, that is no "long straight" or "S" ducting being required.

Figure 16:
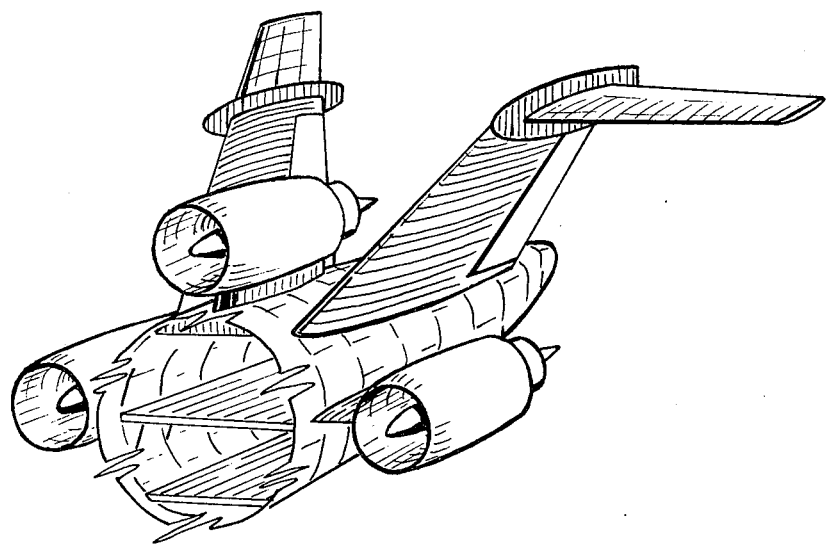

FIG. 16 shows a perspective view of the rear of a conventional forward main wing aircraft using FIGS. 27, 28, 29 and 30 aerodynamic surfaces in the rear fuselage of the aircraft. Upper engine has advantages referred to in FIG. 15.

Figure 17:
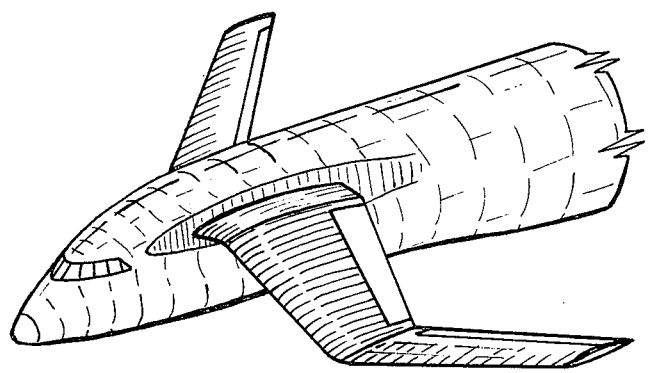

FIG. 17 is a perspective view showing the forward fuselage of an aircraft using an inverted version of FIGS. 23, 24, 25 and 26 types forward lifting elevator.

Figure 18:
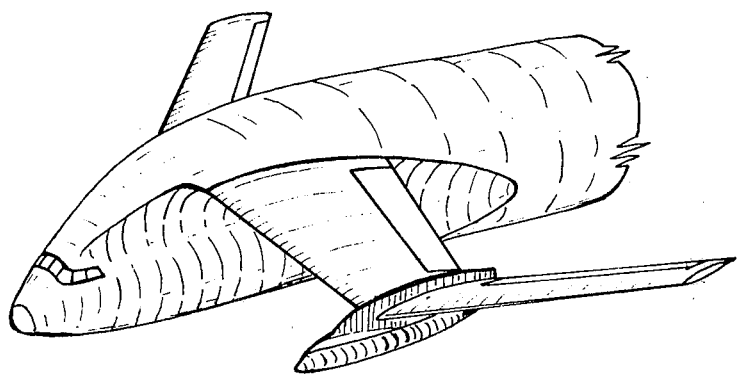

FIG. 18 is a perspective view showing an inverted design of FIGS. 27, 28, 29, 30 and 31 types forward lifting elevator as applied to the forward section of an aircraft fuselage, designed to accommodate same. Optional auxiliary landing gear units, may be designed in the forward wing, at the anhedraled ruddered, and the outer elevator section, intersection, on each side of the forward fuselage, as illustrated.

Figure 19:
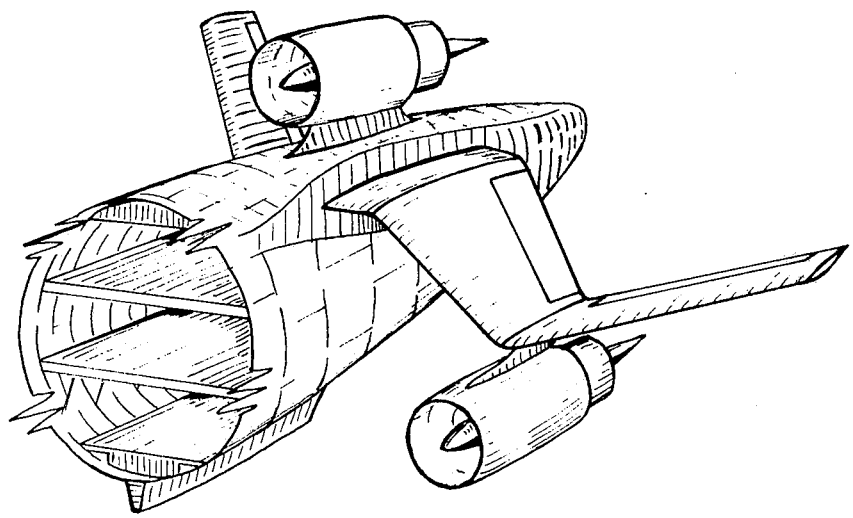

FIG. 19 is a perspective view of an inverted adaptation of FIGS. 23, 24, 25 and 26, with jet engines shown (optional), attached to the movable incidence elevating surfaces, at rear of conventional, forward main wing aircraft. Engine air intake for all engines is of comparable efficiency.

Figure 20:
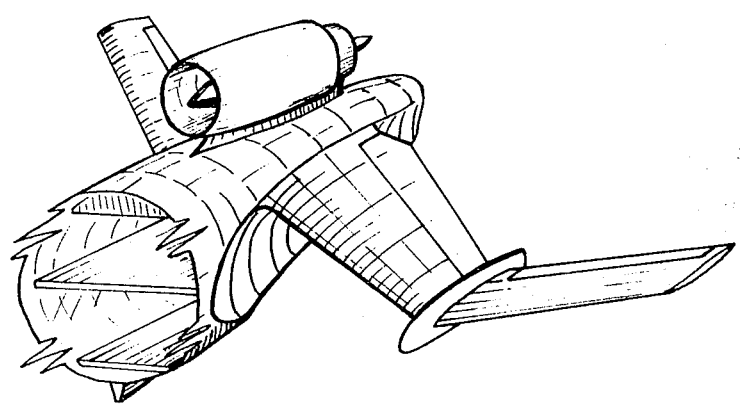

FIG. 20 is a perspective view of the rear fuselage of a conventional forward main wing aircraft. The rear fuselage is designed to accommodate an inverted version of FIGS. 27, 28, 29, 30 and 31 types of rudder and elevator design. Efficient engine mounting is also indicated, requiring no "long straight" or "S" ducting for the air intake. With certain of the above details, namely FIGS. 15, 16, 17, 18, 19 and 20, modifications from the original concept are indicated, by having the inner dihedraled portion, either inverted, or the unit is moved to the rear of an aircraft, or both. This change means that the controls must have their operating movements modified to perform the intended functions, for these particular applications, and some degree of advantage previously mentioned may not now apply.

Figure 31:
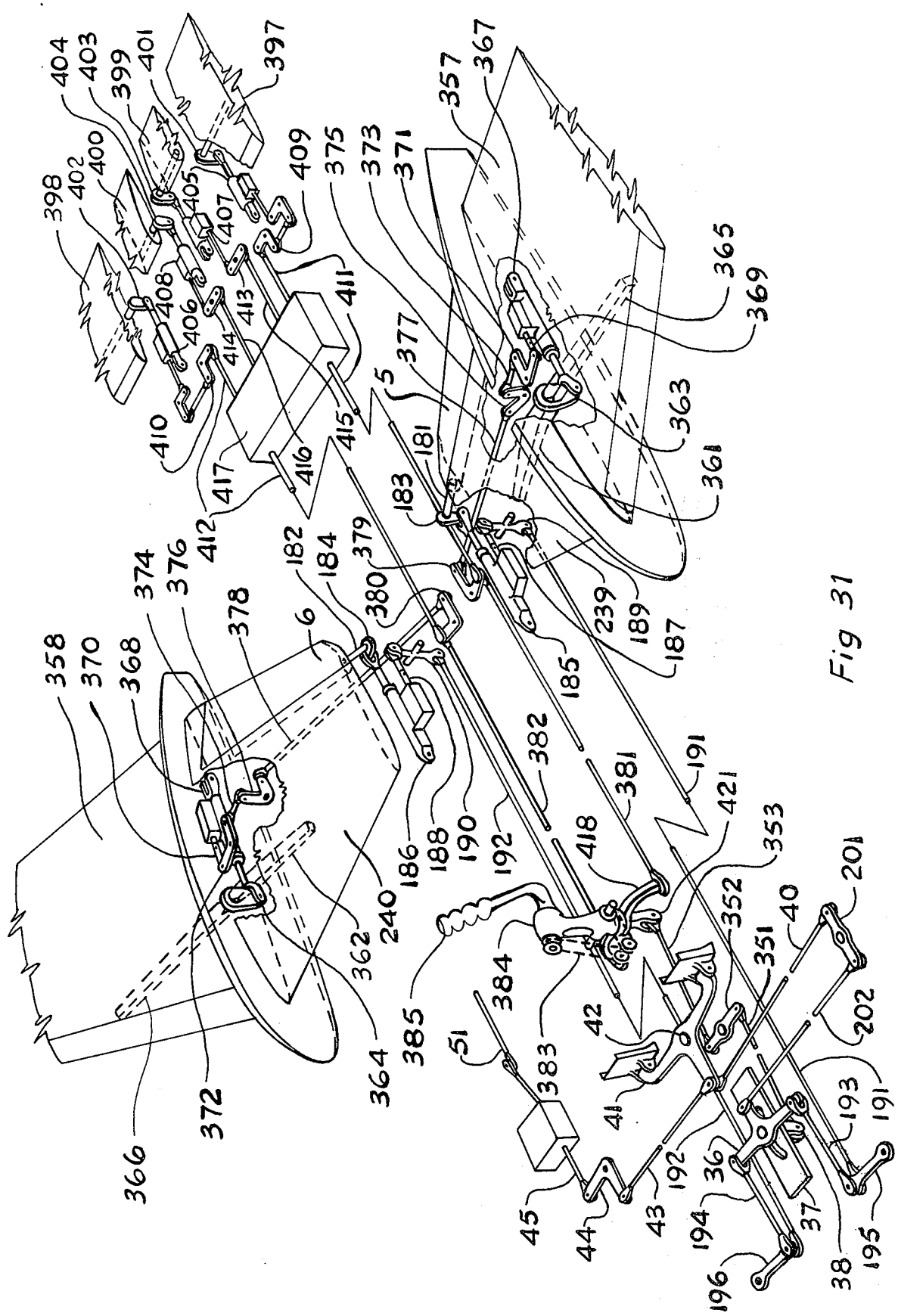

FIG. 21 is a perspective view of a large subsonic, supersonic or multiple sonic speed aircraft where FIG. 31 type forward lifting elevator is suggested. Rearwardly located by virtue of the total aircraft configuration, is an inverted and modified version of FIG. 32 which forms the main wing. This design is such, that the landing gear, forward and rear units, are located on each side of the aircraft center line in the down, or anhedraled, main wing portion, with additional landing gear units located on the downward portion of the aft fuselage, on the aircraft center line. This permits short length landing gear legs, with simplified retraction, and storage, plus good fuel storage capability. The forward, elevating, lifting and flight controlling wing, permits the use of main wing flaps, used in conjunction with the forward lifting elevator. This design configuration, permits a much less critical center of gravity control as fuel is consumed in flight, compared to a delta winged aircraft without forward controls, and a near level landing attitude of the aircraft being normal, with further advantages, such as reduced takeoff and landing lengths. The forward and aft located rudders (aft rudders being trailing edges of the anhedraled main wing, at the fuselage intersection) permits radiused turns in flight, plus side slips, as the pilot may choose, as previously mentioned. These non-retracting forward surfaces are suggested, particularly for the multiple sonic speed version of this aircraft, which is distinctly an advantage for this type of aircraft, which aircraft are intended to operate at great altitude. At this height, large air drops or oscillations are frequently encountered. A delta wing alone, cannot respond to this altitude loss by aft wing, trailing edge control actuation, without sustaining further altitude drop. The addition of lifting forward surfaces, plus a down deflection on the aft wing trailing edge controls, assists in restoring the lost altitude. This control may be actuated by a sensing unit, as part of the automatic pilot control (details not shown). This aircraft also features engine air intake area of sufficient "oversize" to contain intake air at all aircraft speeds, and uses same to augment aircraft performance (details not shown).

FIG. 22 is a view looking rearwardly on the nose of the aircraft shown in FIG. 21. With reference to FIG. 1 through FIG. 22, in the above, each aircraft shown, suggests a particular choice of control surfaces, for a given configuration, of aircraft. It is pointed out here, that these combinations are but possible suggestions, and that any previously mentioned suitable combination, of airframe and control surfaces may be combined.

The controls about to be detailed, in FIGS. 23 through 34, suggest hinged trailing edge types, as mentioned earlier. Single piece hinged control surfaces are suggested, but multi-segmented control surfaces with individual controls working as units are also included, to suggest but one alternative. Any form of control about my forward lifting elevator is also intended; i.e., engine actuated air, or engine exhaust, or any combination of the above, combined with surrounding, or ambient air, may be actuated over, or through, or under, or in combination of the above, as applying to the forward lifting elevator, wing surfaces, to give the desired lifting, or vertical takeoff and landing, and controlling action, to the invention. In order to fully illustrate the controls, and moving parts, of this invention in its many forms, certain ratios of say control wheel movement, to control surface movement, may show exaggerated or reduced sizes of some components, purely to clarify the intended function of the various parts. An object of the invention is to assure the transfer of proper ratios of movement from the pilot actuated controls and devices, to the movable elements, when performing their intended functions, by the use of proper leverage lengths, or radii of sheaves.

Having shown many aircraft configurations, FIG. 1 through FIG. 22, less FIGS. 15, 16, 19 and 20, with forward lifting elevators embodied therein, the following figures now illustrate certain of the various versions of the wing surfaces, working parts. Namely, levers, links, pulleys, cables, hydraulic jacks, etc., which actually constitute certain of the actuating details of some embodiments of the patent. That is, specific details of the design, and operation of the forward, lifting, elevator in certain of its various configurations. Any one of the above designs may be applied to a light slow-speed aircraft, or may also apply to a large supersonic aircraft. Cable and manual control may be shown, but hydraulic actuation may also be used, or a combination of the aforementioned, depending on the application. The method of control shown, for a given figure, may be changed to suit a particular application, and the control method shown in any given figure, is but a means of illustrating the principle of controlling the various, movable surfaces, embodied in the design. All possible control methods, which may apply, may also be designed for fly-by-wire controlling.

Figure 35:
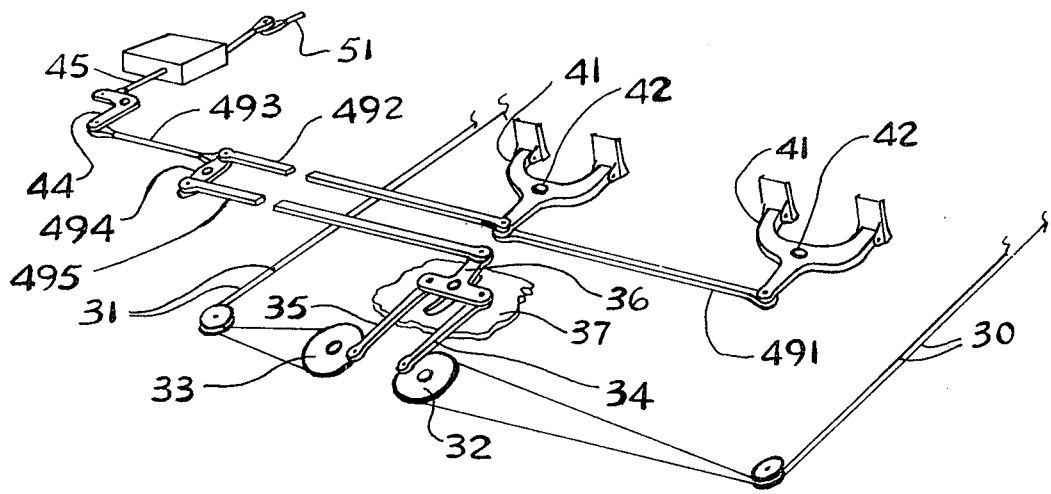
Figure 36:
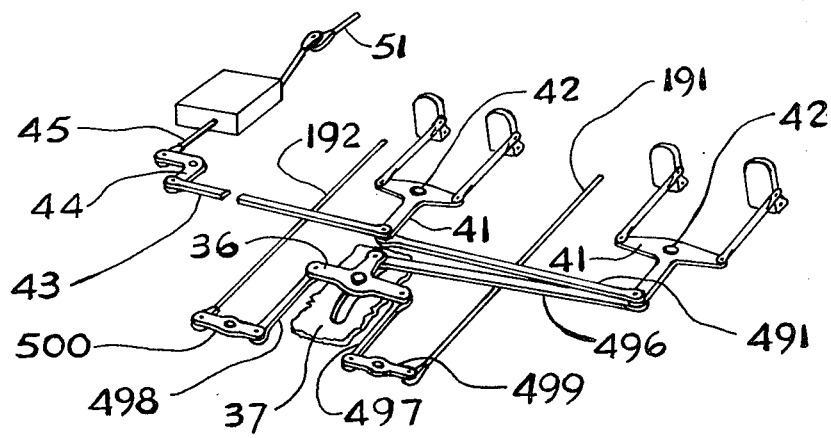
Figure 37:
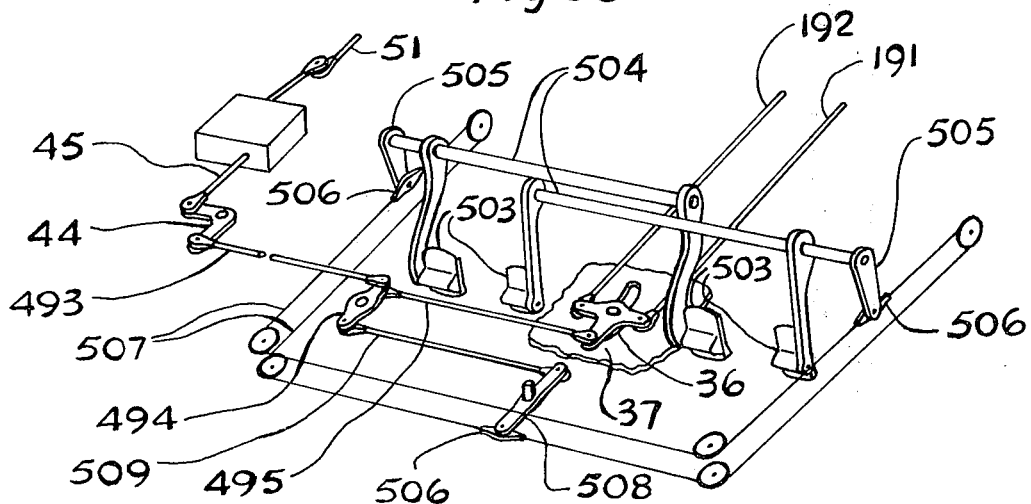

FIGS. 35–37 show various control pedal arrangements to be used with this invention.

A DETAILED DESCRIPTION OF THE PREFERRED EMBODIMENTS

Figure 23:
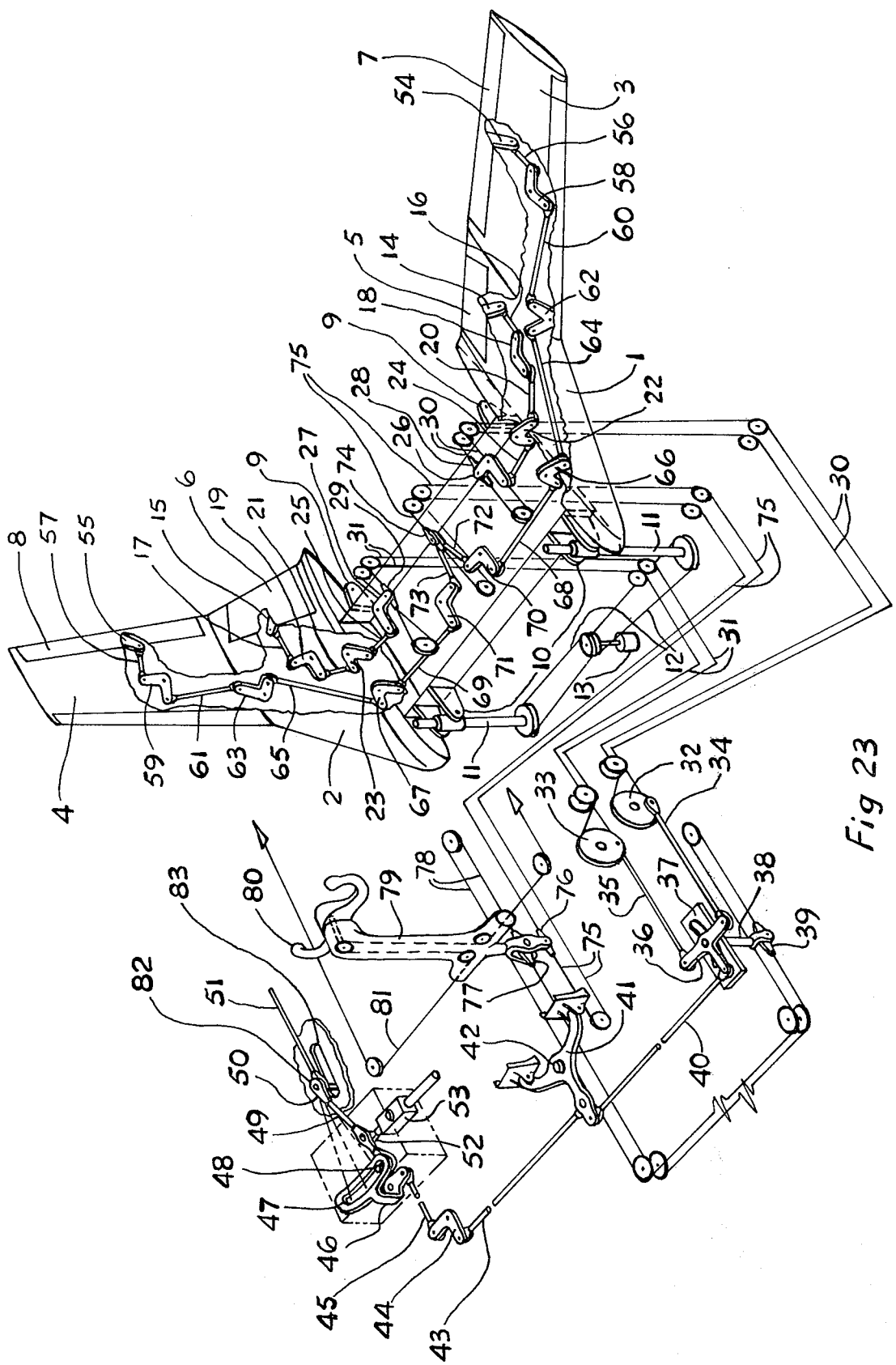

FIG. 23 shows forward lifting and controlling wing surfaces with a variable incidence capability, preferably controllable by the pilot, which control actuates the total surfaces about the hinges 9, for any desired forward plane angle change. FIG. 23 shows hinges at rear with, incidence changing means forward. These locations may be reversed. The hinges have their fixed portions attached to the aircraft fuselage structure and the movable hinge portions attached to the wing surfaces, structure. Drive motor 13, chain drives 12, which actuates screw jacks 11, apply variation of incidence via nuts in brackets 10 by means of suitable control mechanisms (not shown). These forward lifting elevator surfaces may be of fixed incidence, which would not require the above incidence changing mechanism. The following details apply to both the fixed and variable incidence versions of these surfaces.

1 and 2 are fins, set with an appropriate dihedral angle, which move up and out, on each side of the aircraft forward, fuselage. 3 and 4 are outer wing surfaces, attached to the dihedraled fins 1 and 2, which further spread outboard, close to the horizontal position. 5 and 6 are movable trailing edge hinged control surfaces, attached to fins 1 and 2, while 7 and 8 are movable trailing edge hinged control surfaces attached to fins 3 and 4. Control surfaces 5, 6, 7 and 8 have a capability to move up and down, about their hinge fulcrum location. Crank arms 14 and 15, attached to 5 and 6, are actuated by push-pull rods 16 and 17 which are attached to crank arms 14 and 15, by self-aligning ball and socket joints. Ball and socket joints are used throughout, at a rod and lever, or rod and bell crank connection, or any other suitable pivotal type connection, unless otherwise stated. Push-pull rods 16 and 17 are connected to bell crank levers 18 and 19 which are pivotally supported. Push-pull rods 20 and 21 also convey intended actuation via bell cranks 22 and 23, pivotally supported, to push-pull rods 24 and 25 via bell cranks 26 and 27, also pivotally supported. Bell cranks 26 and 27 are attached to cables 30 and 31, via pivotal connections 28 and 29. The above mechanism is operated by cables 30 and 31, which are suitably positioned, by guide sheaves, about which the cable is looped. Cables 30 and 31 are also fixed to pivotally supported operating sheaves 32 and 33, which in turn are connected to oscillating bracket 36, via push-pull rods 34 and 35. In turn, bracket 36 also connects to push-pull rod 40. Control bracket 36 oscillates about a center bearing which is located in bracket 38. Bracket 38 is capable of sliding in radiused cutout in plate 37, in which it is contained. Push-pull rod 40, in turn is connected to rudder bar 41 which rotates about pivotal support 42, attached to fuselage floor structure. Plate 37, supported by fuselage structure, is provided with a radiused slot which is formed to match push-pull rod 40, so that as cable 78 actuates sliding bracket 38 via pivotal connection 39, within the radiused slot of 37, with the rudder bar held in a centered position, no rudder actuating action is conveyed to push-pull rods 34 and 35. A straight cut slot, without the above advantages may also be used. Crank arms 54 and 55, attached to control surfaces 7 and 8, are actuated by push-pull rods 56 and 57 which are attached to bell crank levers 58 and 59, by ball and socket joints as previously mentioned. Bell crank levers 58 and 59 are pivotally supported. Push-pull rods 60 and 61 further convey movement, via bell cranks 62 and 63, pivotally supported, to actuate push-pull rods 64 and 65, which are attached to pivotal supports 66 and 67. In turn, push-pull rods 68 and 69 are connected to bell crank levers 70 and 71, pivotally supported, which actuate push-pull rods 72 and 73, which are joined via pivotal connection 74, which in turn is attached to cable 75. The above mechanism is actuated by cable 75, which is suitably positioned by guide sheaves, about which the cable is looped. In turn, actuation of cable 75 is via pivotal connection 76, attached to cable 75 and control column 79. Control column 79 also actuates cable 78, to which it is attached by pivotal connection 77, which cable is suitably positioned by guide sheaves, about which the cable is looped. Pilot control wheel 80 is used to convey intended aileron action on main aft wing via continuous cable 81 and necessary guide sheaves.

The function of the parts numbered in the previous pages are now more fully described in this particular version of the patent.

With rudder bar 41 centered, and when the pilot pulls control column 79, by control wheel 80, backwards, control cables and levers convey this movement to control surfaces 5, 6, 7 and 8. All four surfaces then move down. This action creates increased lift, which causes the aircraft to gain altitude, when flying in a normal flight path or at takeoff. Conversely, when control wheel 80 is moved forward, control surfaces 5, 6, 7 and 8 move upward. This action creates decreased lift, which causes the aircraft to lose altitude, and the nose of the aircraft to move downwardly. Steering of the aircraft is achieved by rudder bar 41, when acted upon by either foot pedal, which pedals are a part of bracket 41, actuates oscillating bracket 36, via push-pull rod 40, which then differentially moves push-pull rods 34 and 35. These rudder inducing movements can be applied with sliding bracket 38, at any position within the radiused slot in 37, wherein it is contained, which via previously described controls, actuates movable control surfaces 5 and 6. Control surfaces 5 and 6 may then be operated as either rudders, for steering purposes, or as elevators, and since the operation of these functions does not interfere with each other, the movements may be composites of both operations. Further to the above, rudder control actions may be superimposed on elevator control actions, and elevator control may be superimposed on rudder control, at any and at all times, and without the control of the one function washing out the control of the other function. Control surfaces 7 and 8 continue to function as outer elevator controls, unaffected by the rudder movements of control surfaces 5 and 6. The additional aft rudder actuating mechanism, which is initially actuated by push-pull rod 43, may be an optional addition to the basic forward lifting elevator steering capability, but when designed into the total aircraft from the initial concept, a new advantage in aircraft steering control is achieved, as described earlier.

Aft rudder actuation mechanism is now described. This unit is used in many variations of the patent which follow.

Push-pull rod 43 is pivotally connected to rudder bar 41 and also bell crank lever 44. Push-pull rod 45 conveys movement of bell crank lever 44 to variable actuator, or neutralizer, bracket 46. Bracket 46 is equipped with radiused slot 47 within which roller 48, attached to push-pull rod 49 rolls. Rod end 50 is attached to push-pull rod 49. Rod end 50 and rod end of push-pull rod 51 have a common fulcrum 82, which is also a roller, which slides in fixed slot 83, attached to the fuselage structure as slotted bracket 46 is actuated. Control unit 53, preferably controlled by the pilot, positions push-pull rod 49, which gives desired aft located rudder, or rudders, their intended deflected position, as the rudder bar 41 is actuated. Centering push-pull rod 49, via control 53 in radiused slot 47, would neutralize aft rudder deflection, when forward rudder action is applied. Described earlier, fore and aft rudder control is now made possible.

Figure 24:
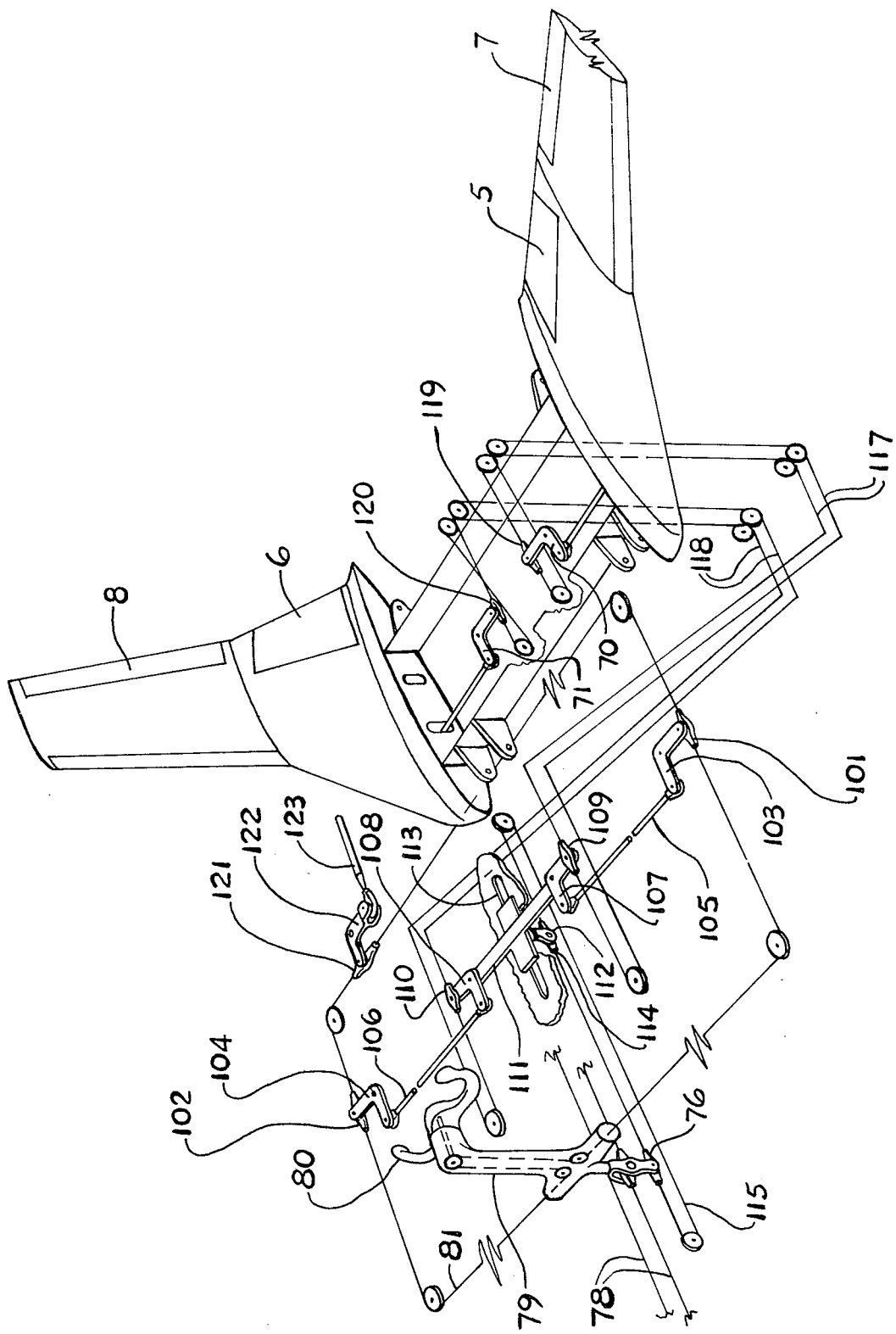

FIG. 24 is a modified version of FIG. 23. The inboard dihedraled fins, with the outboard attached horizontal fins, are unchanged, per FIG. 23. So also are the trailing edge control surfaces 5 and 6. The mechanism which actuates the aft rudders is also unchanged. Introduced by this modification is an aileron, or differential control capability, added to control surfaces 7 and 8, which still perform their original elevator function, and these controls, then assist, and work, in conjunction with the aft, main wing aileron controls, to reduce fuselage torquing or twisting, by using both the forward wings and aft main wings, for this control function, and again this added advantage, will reduce fuselage weight, which advantage becomes more apparent when future, very large aircraft are considered. The outer movable hinged control surfaces 7 and 8, with their attendant control mechanisms, are also unchanged per FIG. 23, up to and including, bell cranks 70 and 71. At this juncture, bell cranks 70 and 71 become independently controlled members. Aft aileron control is actuated by control wheel 80, which transmits movement to continuous control cable 81 in FIG. 23, and also now in FIG. 24. Continuous control cable 81 is further detailed in FIG. 24 to show continuous cable 81 with pivotal connection 121 attached to bell crank lever 122, pivotally supported, to which push-pull rod 123 is connected, which push-pull rod actuates the aft main plane ailerons common to FIGS. 24, 26, 28, 30 and 33. Continuous cable 81, also has pivotal connections 101 and 102 attached, which are connected to bell crank levers 103 and 104, which are pivotally supported. Push-pull rods 105 and 106 are pivotally connected to bell crank levers 103 and 104, with their other ends pivotally connected to bell crank levers 107 and 108. In turn, bell crank levers 107 and 108 are pivotally supported at each end of actuating bracket 111, which slides fore and aft in slotted bracket 113, attached to the fuselage structure. Bracket 112 is attached to sliding bracket 111. Pivotal connection 114 is connected to bracket 112 and cable 115, which cable is suitably positioned via guide sheaves. Pivotal connection 76 is attached to control column 79 and also cable 115. Control cable 78 is unchanged as described in FIG. 23. The slotted bracket 113 may be changed to use any suitable design method which would convey the intended movement of actuating bracket 111. This statement applies to all figures which feature forward aileron control. Reverting back to bell cranks 107 and 108, pivotal connections 109 and 110, are attached to bell cranks 107 and 108 and also control cables 117 and 118. These control cables, which are suitably positioned, by guide sheaves, make connections with bell cranks 70 and 71, via pivotal connections 119 and 120.

The funnction of the forward, additional aileron controls are now described. When pilot control wheel 80 is rotated, continuous control cable 81 operates bell crank levers 103, 104 and 122, which in turn convey movements to cables 117 and 118, and this action is then conveyed to control surfaces 7 and 8 as previously described in detail. This action, which is then a duplication, of the main, aft placed wing, aileron movement, has the effect of rolling the fuselage as the pilot may direct, from a forward, and also an aft of the fuselage center, location. This capability has the effect of keeping fuselage torquing or twisting to a minimum. Should the pilot control wheel be moved forward or aft, this action then slides bracket 112 in slot 113. With the control wheel held without rotating, this sliding action gives elevator action at 7 and 8. At any time during this action, and with bracket 112 at any position in slide 113, aileron actuation may also be applied, by the rotation of control wheel 80. Control surfaces 7 and 8 may be operated at times as either ailerons or as elevators, and since the operation of these functions does not interfere with each other, the movements may be composites of both operations. Furthermore, aileron control actions may be superimposed on elevator control actions, and elevator control may be superimposed on aileron control, at any and all times, and without the control of the one function washing out the control of the other function. Control surfaces 5 and 6 continue to function as inner elevator and/or rudder controls, unaffected by the aileron movements of control surfaces 7 and 8.

Figure 25:
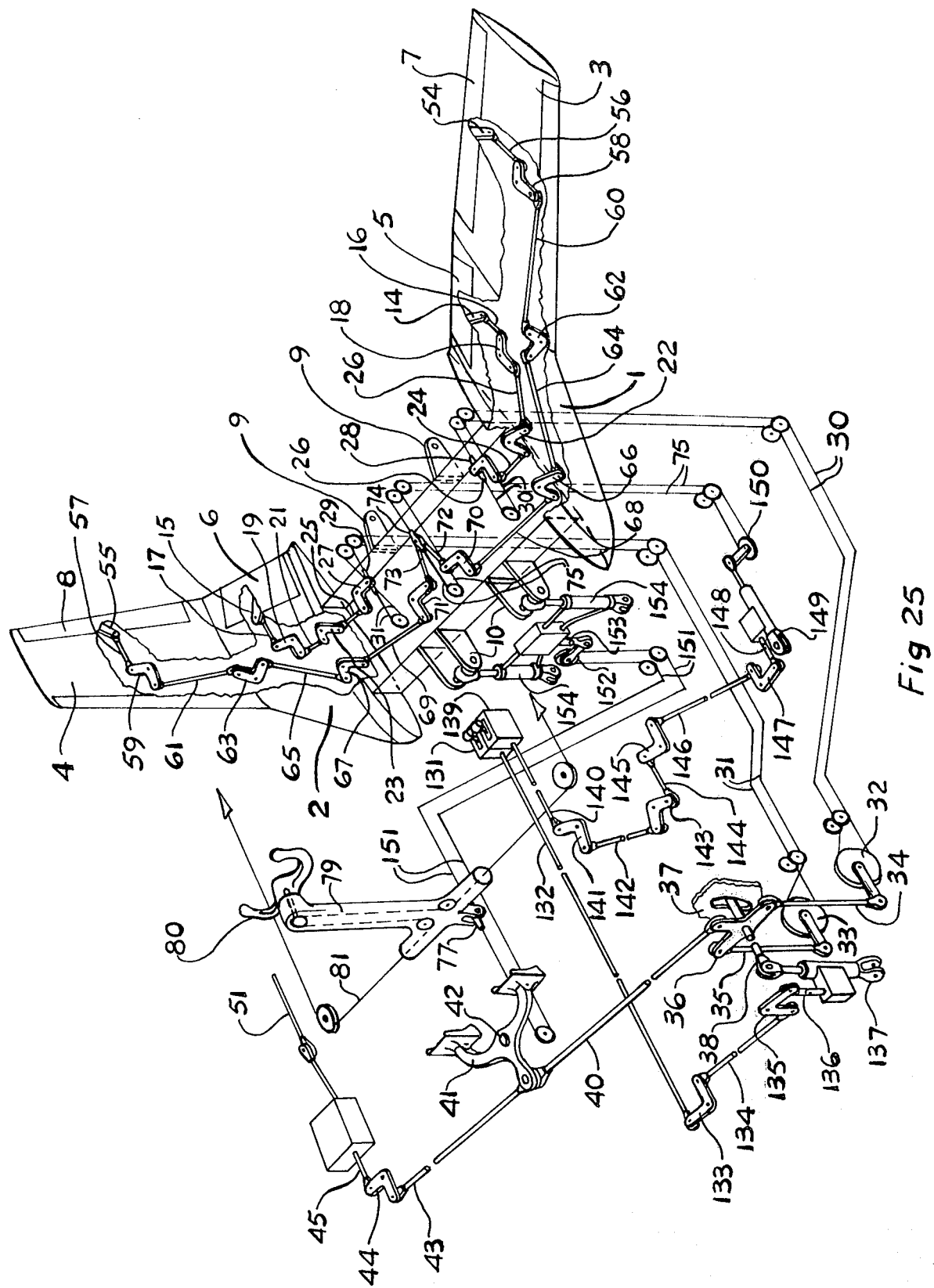

FIG. 25 shows forward lifting and controlling wing surfaces, with a variable incidence capability, basically the same as FIG. 23. The aft rudder mechanism is also per FIG. 23. The real difference lies in the fact that the variable incidence capability of FIG. 23 was a secondary control device, with the hinged trailing edge surfaces, performing direct control functions. In FIG. 25 the total wing surfaces are hinged, and the main aircraft elevation controlling is performed by actuating the total forward wing surfaces. The hinges may be at the rear with controlling means forward, or the hinges may be forward with the control means aft. This description shall feature aft hinges. Forward rudder control is basically unchanged in FIG. 25 when compared to FIG. 23, except for the placing of control components, which are directly actuated by the foot pedals, in an up and down, compared with a fore and aft condition, as previously shown, and this design is indicated to show another variation of the control system, which may be substituted in other versions of the patent. When pilot control wheel 80 is moved forward or aft, control cable 151 attached to control column 79, conveyed to control wheel 80, by pivotal connection 77, actuates hydraulic control valve 153, via cable actuated wheel 152, which in turn causes actuation of hydraulic jack 154 which then moves the total wing surfaces 1, 2, 3 and 4 about hinges 9, in an up or down direction. Lever controls 131 and 139 actuated by the pilot, may be used together or separately, to actuate trailing edge control surfaces 5, 6, 7 and 8. Many variations of the hinged trailing edges may be actuated. An example being, that at any time or at a certain minimum air speed, controls 5, 6, 7 and 8 may be hinged in a down position, to give more lift by pilot actuation, or a suitable automatic control means. A variant may be to use only outer control surfaces 7 and 8, deflected down, or another version may be to depress only, control surfaces 5 and 6. During total surfaces 5, 6, 7 and 8 hinged actuation of the above variants, rudder control surfaces 5 and 6 may be applied at any elevator deflected position as previously described. Also as previously described, the forward wing surfaces may be actuated in conjunction with the aft surfaces to give direct rise or fall or side movements to the total aircraft as previously described. FIG. 25 utilizes the same numbered parts as FIG. 23, from detail 1 through 81, less 11, 12, 13, 39–76 and 78. To complete the description of movable parts shown in FIG. 25, control lever 139 actuates push-pull rod 140, which is connected to bell crank lever 141, which is pivotally supported, and is also connected to push-pull rod 142, which is connected to bell crank lever 143, which is also pivotally supported. Push-pull rod 144 is connected to bell crank lever 143 also, with its other end connected to bell crank lever 145, which is pivotally supported. Push-pull rod 146 is also connected to bell crank lever 145 at one end, with its other end attached to bell crank lever 147. Bell crank lever then actuates hydraulic control valve 148, which in turn actuates hydraulic jack 149 which rotates levered, pulley wheel 150 to which cable 75 is anchored, thus operating outer trailing edge controls 7 and 8 in an up or down position as desired, by the actuation of hand control 139. In like manner, hand control 131, when actuated, moves push-pull rod 132, which is attached to bell crank lever 133, pivotally supported. Push-pull rod 134 is attached to bell crank levers 133 and 135. Bell crank lever 135 is pivotally supported, to which control valve 136 is attached, which in turn actuates hydraulic jack 137, which actuates bracket 38, which is free to slide in radiused slot located in plate 37, in which it is contained. To summarize this control variation, when control wheel 80 is moved aft, the total surfaces 1, 2, 3 and 4 rotate upward about hinge 9. A reversal of this condition results with the control wheel 80 moved forward. The first condition causes the aircraft to gain altitude, which the opposite condition reduces the aircraft altitude. Steering of the aircraft is by rudder bar 41. When the rudder bar is turned by the pilot's left foot moving forward, trailing edge surface 5 moves up about its hinges, while trailing edge surface 6 moves down about its hinges. A reversal of this condition follows with the pilot pushing the rudder bar right-hand side foot pedal. Aft rudder control is per FIG. 23.

Figure 26:
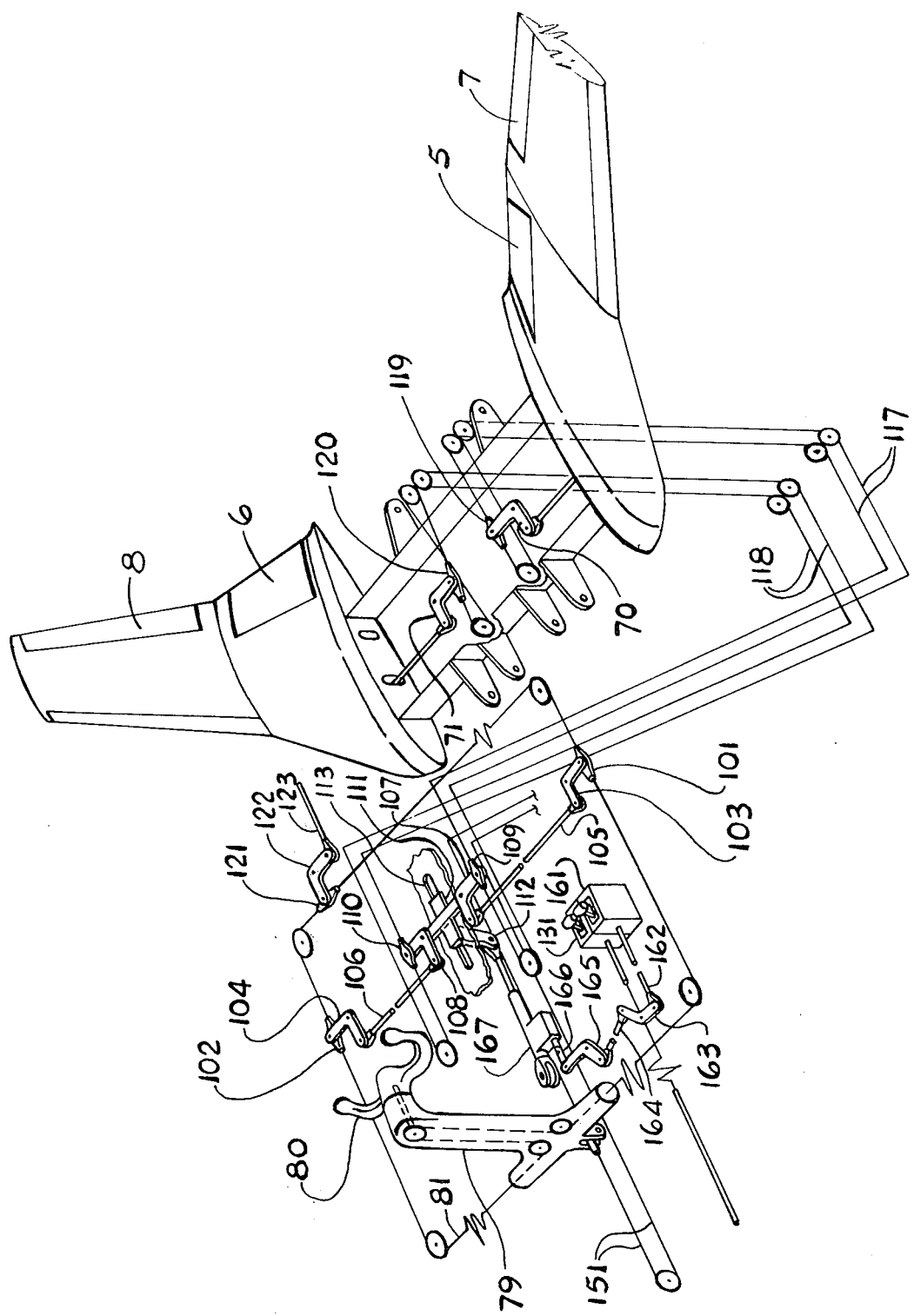

FIG. 26 is a modified version of FIG. 25. The inboard dihedraled fins, with the outboard attached horizontal fins, are unchanged, per FIG. 25. So also are the trailing edge control surfaces 5 and 6. The mechanism which actuates the aft rudders is also unchanged. Introduced by this version is an aileron, or differential control capability added to control surfaces 7 and 8 which still perform their original elevator function, and these controls, then assist, and work, in conjunction with the aft, main wing aileron controls, as previously described in FIG. 24. The outer movable hinged controls 7 and 8, with their attendant control mechanisms, are also unchanged per FIG. 25, up to, and including bell cranks 70 and 71. At this juncture, bell cranks 70 and 71 become independently controlled members. Aft aileron control is actuated by control wheel 80, which transmits movement to continuous control cable 81 in FIG. 25, and also now in FIG. 26. Continuous control cable 81 has pivotal connections 101 and 102 attached, which are connected to bell crank levers 103 and 104, which are pivotally supported. Push-pull rods 105 and 106 are pivotally connected to bell crank levers 103 and 104 with their other ends pivotally connected to bell crank levers 107 and 108, which are pivotally supported at each end of sliding bracket 111, which slides fore and aft in slotted bracket 113, attached to fuselage structure. Bracket 112 is attached to sliding bracket 111, to which is connected actuating lever of hydraulic jack 167, which is controlled by pilot operated hand control 161. When hand control 161 is actuated, push-pull rod 162, which is also connected to bell crank lever 163, moves bell crank 163 which is pivotally supported. Also attached to this bell crank lever 163 is push-pull rod 164, which has its other end attached to bell crank lever 165, which is pivotally supported. Connected to the other end of bell crank lever 165 is the actuating rod 166 which controls hydraulic jack 167 which is attached to, and moves bracket 112 to which it is connected. Hand control 131 and control cable 151 are unchanged as described in FIG. 25. Hand control 161 replaces hand control 139 in FIG. 25, and apart from this difference, the operation of the control is similar to the action associated with the operation of FIG. 25 controls.

Figure 27:
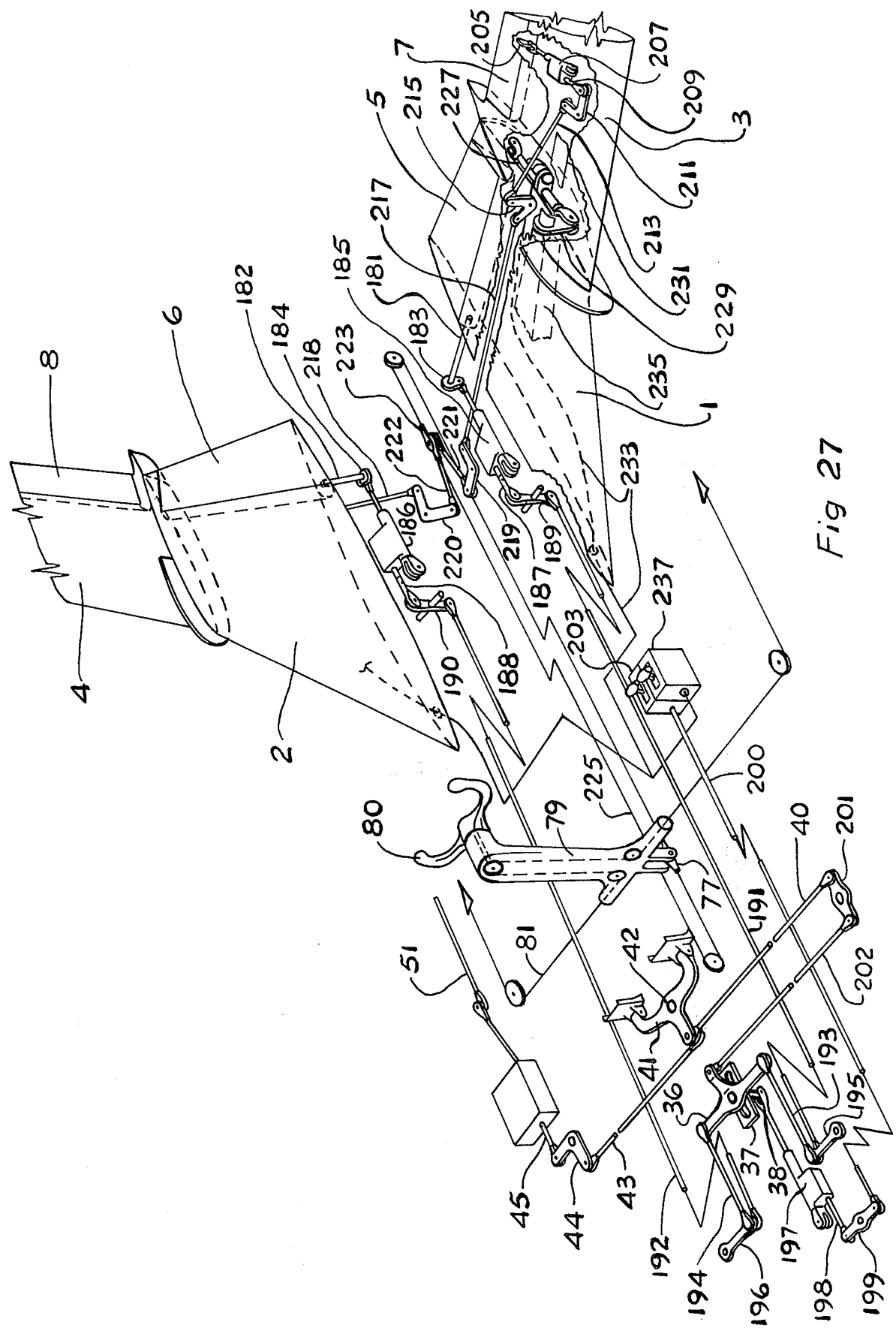

FIG. 27 shows forward lifting and controlling wing surfaces with the same type of inboard dihedraled, and outer near-horizontal wing surfaces, as used in FIGS. 23, 24, 25 and 26. Aft rudder actuation is unchanged per FIG. 23. The major difference being in the fact that in FIG. 27 the inboard dihedraled fins 1 and 2 are fixed to the aircraft forward fuselage, and the outer wing surfaces 3 and 4 further spread outboard, close to the horizontal position, which outer portions are attached to the inboard dihedraled fins (see sketch for FIG. 27), by outer wing spars 231 and 232, fixed to the outboard wings 3 and 4, respectively. Actuated by levers 229 and 230 which are part of spars 231 and 232 which are free to rotate about the axis of inboard spars 235 and 236 attached to inner wings 1 and 2, respectively (see sketch 27). 5 and 6 are movable trailing edge hinged control surfaces, attached to fins 1 and 2, while 7 and 8 are movable trailing edge hinged control surfaces attached to fins 3 and 4. When pilot control wheel 80 is moved forward or aft, control cable 225 attached to control column 79 by pivotal connection 77, actuates pivotal connection 223 which in turn actuates push-pull rods 221 and 222, which in turn are connected to bell crank levers 219 and 220 which are pivotally supported. Also connected to bell crank levers 219 and 220 are push-pull rods 217 and 218. Left-hand side numbered parts only are pictured in FIG. 27 in some instances, with the accompanying number indicating part used on opposite side of aircraft, per example of numbered parts shown. This method is used in other figures to follow. Push-pull rods 217 and 218 are connected to bell crank levers 215 and 216 which are pivotally suspported. Also connected to bell crank levers 215 and 216 are push-pull rods 213 and 214 which are in turn connected to bell crank levers 211 and 212 which bell crank levers are pivotally supported. Also connected to bell crank levers 211 and 212 are actuating rods 209 and 210 which control hydraulic cylinders 207 and 208 which, via crank arms 205 and 206 attached to hinged control surfaces 7 and 8, move the control surfaces when actuated by pilot control wheel 80, when moved in a fore and aft direction. Pilot hand control cable 237, when actuated, conveys control intention for any desired forward plane 3 and 4 angle change via control cable 233 to drive motors which are a part of screw jacks 227 and 228. Screw jacks 227 and 228 are rotated by suitable drive mechanisms, which are part of screw jacks 227 and 228. The screw jacks 227 and 228 are anchored to the fixed fins 1 and 2, while the moving ends are attached to crank levers 229 and 230, which are a part of outer wing spars 231 and 232, as previously described. Rudder bar 41, which rotates about pivotal support 42, attached to fuselage floor structure, is connected to pushpull rod 40. Also attached to rudder bar 41 is push-pull rod 43 which actuates the aft rudder mechanism, as previously described in FIG. 23. Push-pull rod 40 is also connected to lever 201 which is pivotally supported at its center. Push-pull rod 202 is connected to the other end of lever 201 (see sketch) and has its other end connected to oscillating bracket 36. Push-pull rod 193 has one end connected to bracket 36 with its other end connected to radius arm 195. In like manner, push-pull rod 194 has one end connected to bracket 36 with its other end connected to radius arm 196. Bracket 36 oscillates about bearing bracket 38 which is located in bracket 37, which has a radiused slot, function of which was described in FIG. 23. Attached to bracket 38 is operating arm of hydraulic cylinder 197 which cylinder is anchored to fuselage structure. Push-pull rod 198 controls hydraulic cylinder 197 which is moved in turn by pivoting bracket 199 which pivots about its center, with rod 198 and push-pull rod 200 connected to its ends. Push-pull rod 200 is operated by pilot control rod 203. Also connected to radius arms 195 and 196 are push-pull rods 191 and 192, which rods convey movement to pivotally located levers 189 and 190, to which they are connected. Also connected to levers 189 and 190 are actuating rods 187 and 188, which control the movement of hydraulic jacks 185 and 186. Hydraulic actuating motors 185 and 186 are fixed to the aircraft wing structure at one end with the actuating rods attached to levers 183 and 184, which levers are part of control rods 181 and 182 which are attached to control surfaces 5 and 6. Pilot wheel 80, when pulled back, lowers outer trailing edge surfaces 7 and 8 for increased lift. Pilot hand control 203 gives intended movement to inner trailing edge surfaces 5 and 6, and may be set to add to the same action of surfaces 7 and 8. The above trailing edge surfaces may also move up to decrease lift. Direct elevation control is then by outer trailing edge surfaces 7 and 8. Pilot hand control 237 gives the most desirable forward plane angle change as the pilot or other crew members may desire. The rudder bar 41 may be actuated at any time, regardless of the position of trailing edge controls 5 and 6, to give the desired rudder control selected.

Figure 28:
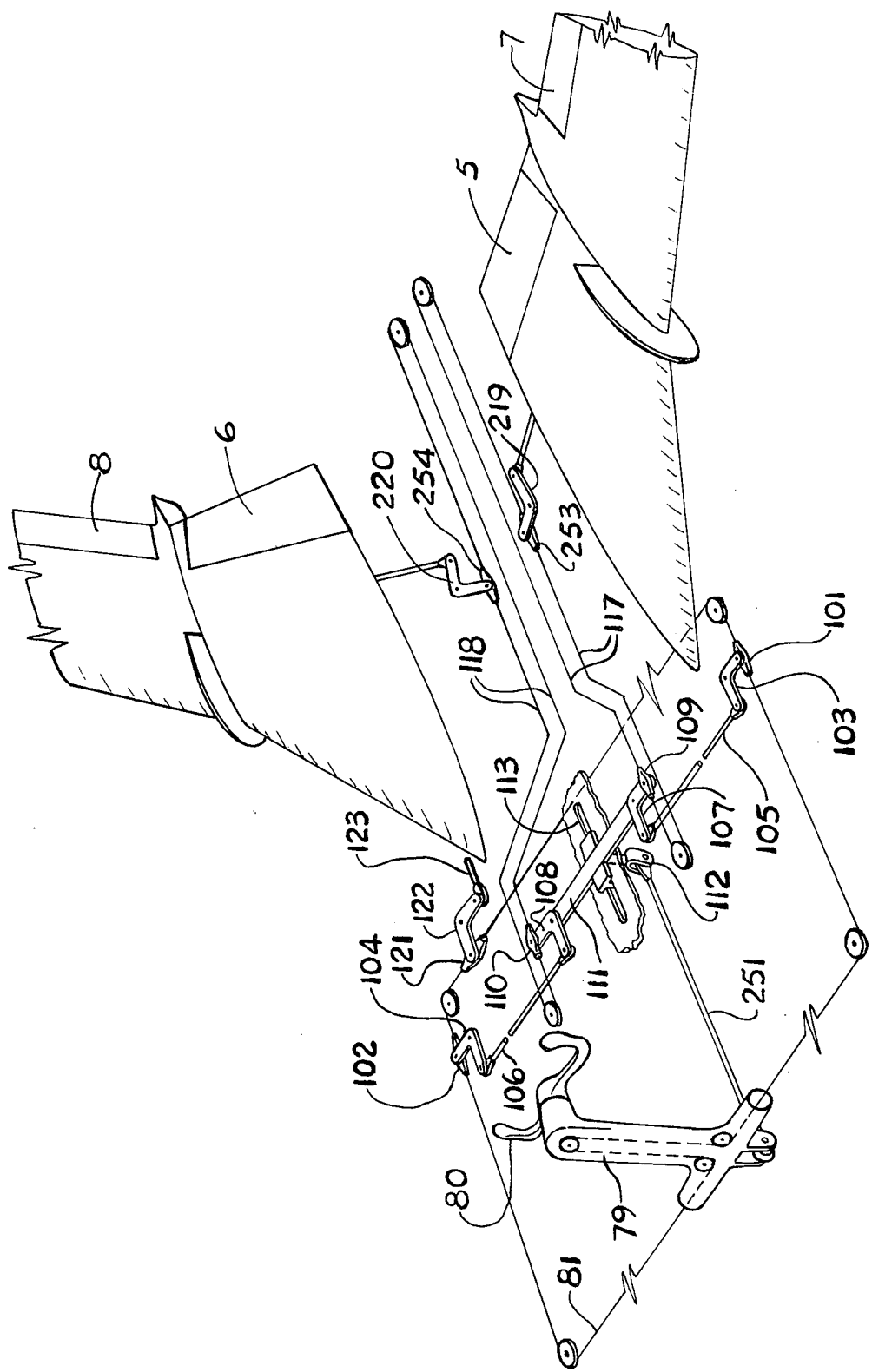

FIG. 28 is a modified version of FIG. 27. The inboard dihedraled fins, with the outboard attached horizontal fins, are unchanged, per FIG. 27. So also are the trailing edge control surfaces 5 and 6. The mechanism which actuates the aft rudders is also unchanged. Introduced by this version is an aileron, or differential control capability, added to control surfaces 7 and 8 which still perform their original elevator function, and these controls, then assist, and work, in conjunction with the aft, main wing aileron controls as similarly described in FIG. 24. The outer movable hinged controls 7 and 8, with their attendant control mechanisms, are also unchanged per FIG. 27, up to and including bell cranks 219 and 220. At this juncture, bell cranks 219 and 220 become independently controlled members. Aft aileron control is actuated by control wheel 80, which transmits movement to continuous control cable 81 in FIG. 27, and also now in FIG. 28. Continuous control cable 81 has pivotal connections 101 and 102 attached, which are connected to bell crank levers 103 and 104, which are pivotally supported. Push-pull rods 105 and 106 are pivotally connected to bell crank levers 103 and 104 with their other ends pivotally connected to bell crank levers 107 and 108, which are pivotally supported at each end of sliding bracket 111, which slides fore and aft in slotted bracket 113, attached to the fuselage structure. Bracket 112 is attached to sliding bracket 111, to which is connected push-pull rod 251 which has its other end connected to control column 79. The ensuing action to actuate controls 7 and 8 is similar to that previously described in FIG. 24.

Figure 29:
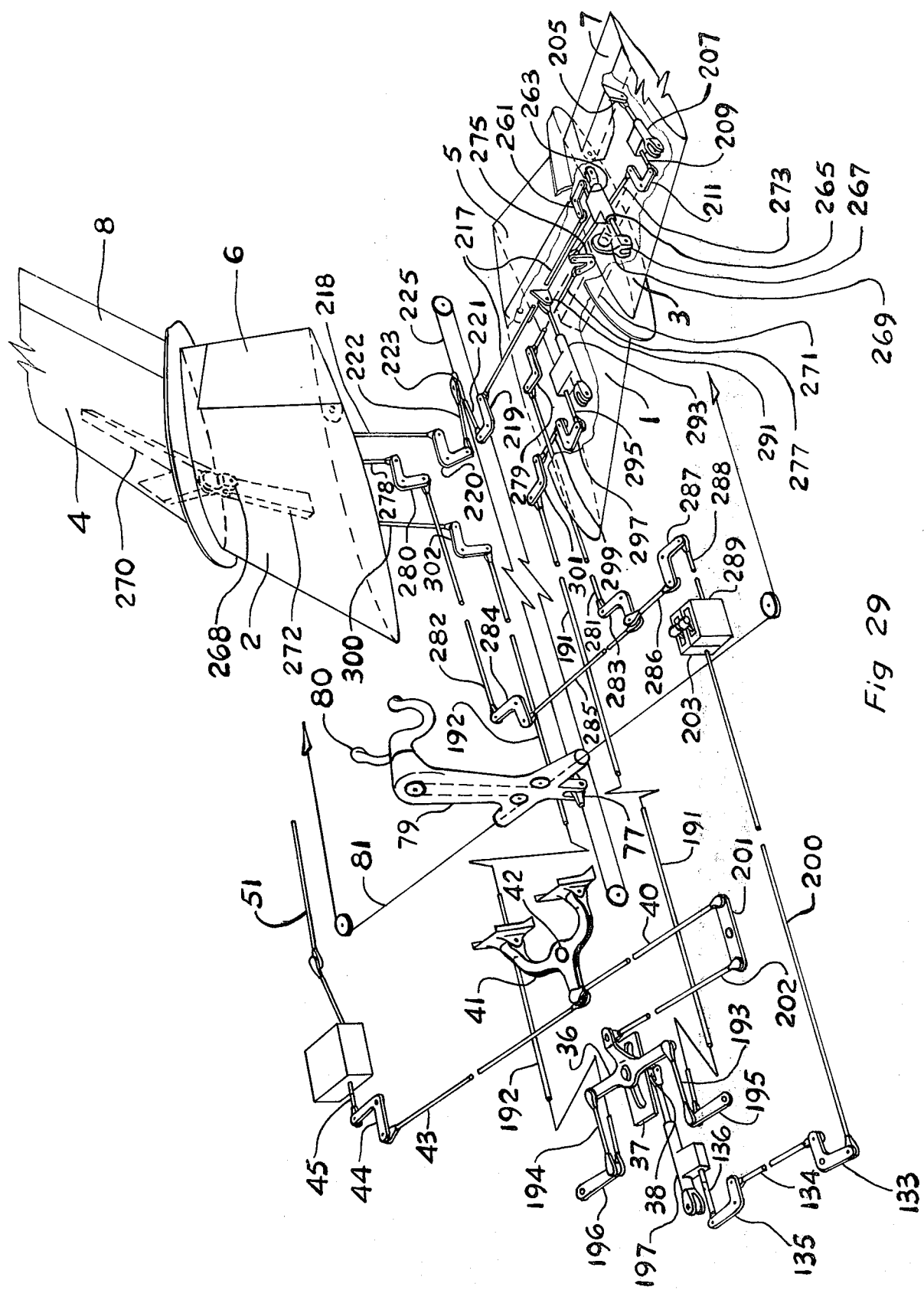

FIG. 29 shows forward lifting and controlling wing surfaces with the same type of inboard dihedraled, and outer near-horizontal wing surfaces, as used in FIGS. 23, 24, 25, 26, 27 and 28. The mechanism which actuates the aft rudders is also unchanged. Introduced by this modification is a further adaptation of the basic lifting and controlling wing surfaces, as modified for FIG. 27 which utilizes fixed dihedraled fins 1 and 2, with the outer near-horizontal surfaces 3 and 4, rotatable for direct incidence adjustment by pilot control 80. In this version, hydraulic jacks 265 and 266 directly rotate wing surfaces 3 and 4, which are attached to wing spars 269 and 270 and are rotated by levers 267 and 268. The outer wing assembly is free to rotate about the axis of inboard spars 271 and 272 which are attached to inner wings 1 and 2, respectively (see sketch 29). In certain instances, the left-hand side numbered parts only are pictured in FIG. 29, with the accompanying number, indicating part used on opposite side of aircraft. To operate hydraulic jacks 265 and 266 and thereby change the angle of incidence of wing surfaces 3 and 4, control actuating rods 263 and 264 are moved by bell cranks 261 and 262 which are pivotally mounted, and are rotated by push-pull rods 217 and 218. Pilot control wheel 80 with accompanying actuating mechanism, up to and including push-pull rods 217 and 218 is the same as that used in FIG. 27. FIG. 29 utilizes the same rudder 5 and 6 actuation part numbers as FIG. 27, from rudder bar 41 through pilot hand control 203, and also utilizes control actuation members from rudder bar 41 through push-pull rods 191 and 192. Push-pull rods 191 and 192 are in turn attached to bell crank levers 301 and 302 which are pivotally supported. Also attached to bell crank levers 301 and 302 are push-pull rods 229 and 300 which are also connected to bell crank levers 297 and 298 which in turn control actuating rods 295 and 296 which control the movement of hydraulic cylinders 293 and 294 which are attached to the aircraft fixed wing structure at one end, with the actuating rods attached to levers 291 and 292, which levers actuate control surfaces 5 and 6. Pilot hand control 289, when actuated, gives up or down setting to trailing edge control surfaces 7 and 8. Crank arms 205 and 206 attached to control surfaces 7 and 8 are actuated by hydraulic cylinders 207 and 208 to which they are attached. Hydraulic cylinders 207 and 208 are anchored in wing structures 3 and 4. Control rods 209 and 210 actuate movement of hydraulic cylinders 207 and 208. Attached to control rods 209 and 210 are bell crank levers 211 and 212, pivotally supported, with push-pull rods 273 and 274 connected to their other ends. Push-pull rods 273 and 274 also make connection with bell crank levers 275 and 276 which are pivotally located to which push-pull rods 277 and 278 make connection with their other ends connected to bell crank levers 279 and 280 also pivotally supported. Push-pull rods 281 and 282 connect with bell crank levers 279 and 280 and also bell crank levers 283 and 284. These last numbered levers are connected by push-pull rod 285 (see sketch). Bell crank lever 287 which is pivotally supported, makes connection with bell crank lever 283 by push-pull rod 286. Also connected to bell crank lever 287 is actuating rod 288, which is controlled by pilot hand control 289. Pilot control wheel 80 with accompanying mechanism directly controls the airplane elevation in flight by direct control of lifting surfaces 3 and 4. With control wheel pulled back, outer surfaces 3 and 4 rotate by raising the leading edge and thereby generate more lift. A forward movement of control wheel 80 gives a reversal of this condition. Trailing edge surfaces 7 and 8 may be set by pilot hand control 289 to add to the intended action of control wheel 80. Pilot hand control 203 may be set to further add to the setting chosen for surfaces 3, 4, 7 and 8. It is also obvious that a great choice of settings may be used with the above numbered controls. The rudder bar 41 may be actuated at any time, regardless of the position of trailing edge controls 5 andd 6, to give the desired rudder control setting.

Figure 30:
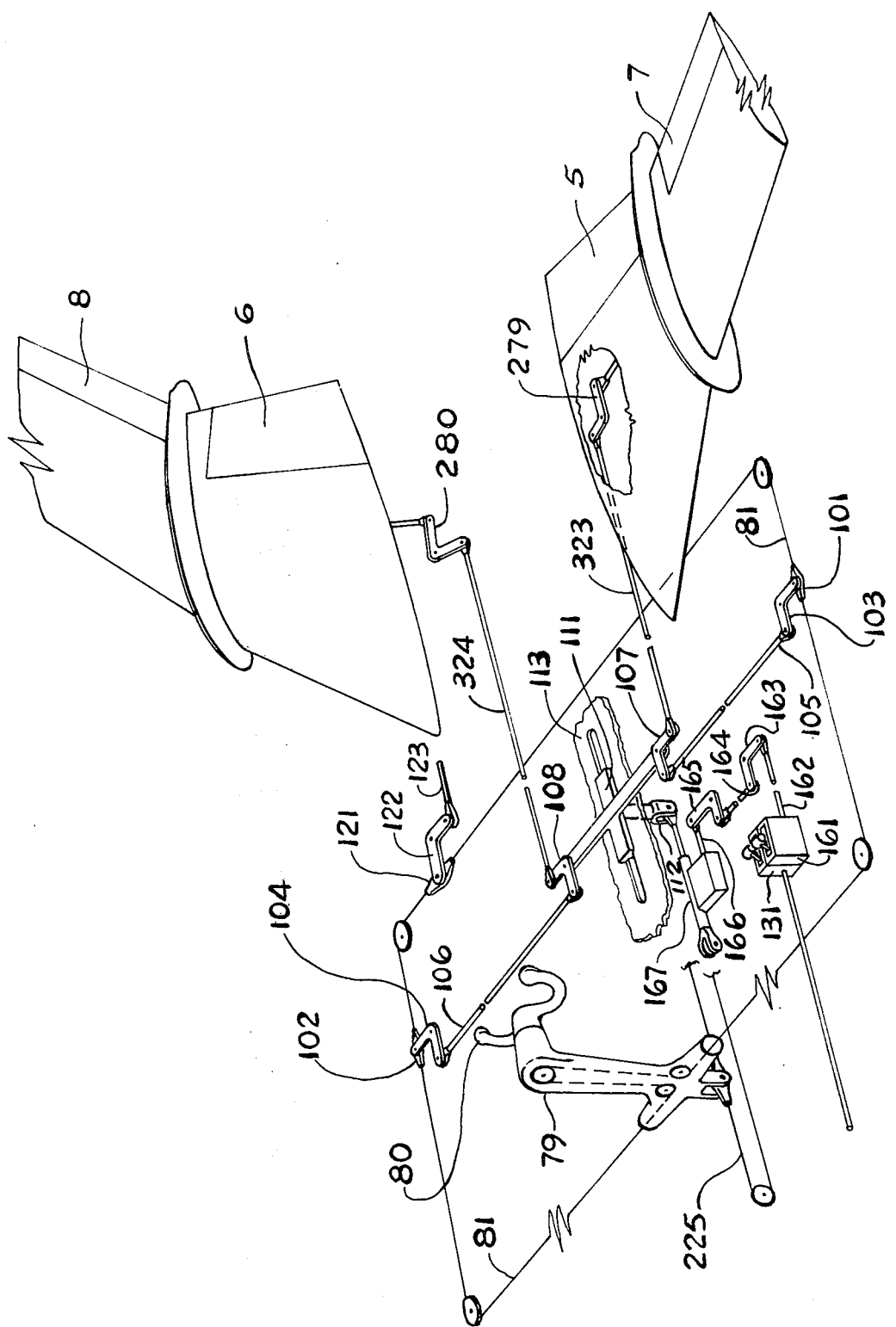

FIG. 30 is a modified version of FIG. 29. The inboard dihedraled fins, with the outboard attached horizontal fins, are unchanged, per FIG. 29. So also are the trailing edge control surfaces 5 and 6. The mechanism which actuates the aft rudders is also unchanged. Introduced by this version, is an aileron, or differential control capability, added to control surfaces 7 and 8, which still perform their original elevator function, per FIG. 29, and these controls, now further assist, and work, in conjunction with the aft, main wing aileron controls as similarly described in FIG. 24. The outer movable hinged controls 7 and 8, with their attendant control mechanisms, are also unchanged, per FIG. 29, up to and including bell crank levers 279 and 280. Push-pull rods 323 and 324 have their ends connected to bell crank levers 279 and 280, and also bell crank levers 107 and 108. In FIG. 30, from pilot control wheel 80 through all control connections, and moving parts, the same numbered parts are used as FIG. 26, with the exception being control cable 225 in FIG. 30, which replaces control cable 151 of FIG. 26. The ensuing action to actuate controls 7 and 8 is similar to that previously described, insomuch that movements imparted to control wheel 80, actuate aft main wing ailerons. This action is now duplicated in surfaces 7 and 8.

FIG. 31 shows forward lifting and controlling wing surfaces, with inboard dihedraled fins, and outer near-horizontal wing surfaces, similar to those used in FIG. 23 through FIG. 30. Aft rudder control which is the same as that detailed in FIG. 23, moves out from rudder bar 41 and then actuates push-pull rod 43, as previously detailed. Added by this particular FIG. 31, is the integrated controls of the aft main plane wing control surfaces, with the forward wing control surfaces. The application of this FIG. 31 series of controls and lifting surfaces is clearly understood when considered as applicable to many of my aircraft types shown, but is particularly described, to apply to supersonic fighter shown in FIG. 6 drawing. In this (FIG. 31) particular version, fixed dihedraled fins 239 and 240 are attached to the aircraft forward fuselage, and the outer wing surfaces 357 and 358, further spread outboard, close to the horizontal position, which positions are attached to inboard dihedraled fins (see sketch FIG. 31) by outer wing spars 365 and 366, fixed to the outboard wings 357 and 358, respectively, actuated by levers 363 and 364 which are part of spars 365 and 366, which are free to rotate about the axis of inboard spars 361 and 362 attached to inner wings 239 and 240. The design feature may also utilize outer wing spars 365 and 366 which would rotate inside fixed inner spars 361 and 362 as one of numerous alternate rotational methods. 5 and 6 are movable trailing edge hinged control surfaces, attached to inner wings 239 and 240, respectively (see FIG. 31). Pilot control stick 385 and lever 421 are parts of control column 384. When pilot control stick 385 is moved forward or aft, control push-pull rod 353 which is connected to lever 421 and lever 352, which is pivotally supported, while push-pull rod 351 is connected to the other end of lever 352 and bracket 38. Pilot control stick 385 can also rock from side to side in control column 384, while the total control column can move back and fore, in the conventional manner. Levered portion 421 of control column 384 is fixed to column 384, and does not rotate, while bracket 418 which is also a part of column 384, rotates via cable or chain action, when stick 385 is rocked from side to side by the pilot hand control 385 (see sketch). Push-pull rods 381 and 382 are connected to each side of bracket 418 by ball and socket joints, and also make connections with bell crank levers 379 and 380 which are pivotally supported. Attached also to bell crank levers 379 and 380 are push-pull rods 377 and 378 which are in turn connected to bell crank levers 375 and 376, pivotally mounted, which levers also have connections with push-pull rods 373 and 374. The other ends of push-pull rods 373 and 374 are connected to bell crank levers 371 and 372 which are pivotally supported, and connect with hydraulic jack control rods 369 and 370 which control hydraulic actuating jacks 367 and 368 which actuate levers 363 and 364 which control the angle of incidence of outer wing surfaces 357 and 358. Rudder pedal control 41 is the same as that detailed in FIG. 27, from foot pedals through various linkages until bracket 38 is shown, which slides in radiused slot of anchor plate 37. Attached also to radius arms 195 and 196 are push-pull rods 191 and 192 which rods convey movements to pivotally located levers 189 and 190 which levers actuate control rods 187 and 188, which control hydraulic jacks 185 and 186 which in turn convey desired actions via levers 183 and 184 which are connected to control rods 181 and 182, which movement, control surfaces 5 and 6. The mechanism employed to give these controls their movement is similar to that shown in detail in FIG. 27. Bell crank levers 379 and 380 have additional control functions. Also attached to these bell crank levers are push-pull rods 411 and 412 which pass through "control mixer box" 417 and further convey intended control movements to hydraulic control actuators 405 and 406 via bell crank levers 409 and 410, pivotally supported, and additional linkages, as may be required, to actuate outer aft control surfaces 397 and 398 via crank arms 401 and 402. Hydraulic actuators 407 and 408 are attached to levers 403 and 404, which in turn are attached to inner aft wing trailing edge control surfaces 399 and 400, which actuators are controlled by push-pull control rods 415 and 416 which actuate pivotally supported levers 413 and 414 which convey intended movements to hydraulic actuators 407 and 408 which units convey their actuator movement to crank arms 403 and 404 which in turn are attached to trailing edge controls 399 and 400. Please note that the last detailed aft main plane surfaces and controls are not shown to any comparative scale with the forward controls, but are contracted to maintain clarity by having total wings, etc., forward and aft, on one drawing. Flight of this aircraft is affected by say a pilot hand pull-back on control column 385, which then conveys such a movement via push-pull rods, previously detailed, to give trailing edge down rotation simultaneously to forward control surfaces 5, 6, 357 and 358 and aft control surfaces 397, 398, 399 and 400, and this pilot command would give a vertical lift to the aircraft. When the control column is moved forward, a vertical descend, in like manner, would result. When pilot foot control 41 is actuated, the forward and aft rudders (see FIG. 6) may by pilot choice as described in FIG. 23, give direct aircraft side movement, or the fore and aft rudders may give a conventional radius of aircraft flight path. This choice of rudder action is controlled by pilot control unit 53 (see FIG. 23). Neutral aft rudder may also be chosen by this control unit. When pilot control column 385 is rocked from side to side, the aircraft then rolls, by control surfaces 357 and 397 on one side of the aircraft and control surfaces 358 and 398 on the other side of the aircraft, acting in unison from a forward and aft location to give roll control to the aircraft. Control mixer box 417 is a selector unit which by pilot choice or automatic means, (details not shown) causes the forward and aft wing controls to move simultaneously, for airplane up, down or side-to-side movements. By control mixer box 417, the airplane may be flown at a constant altitude in a nose high or nose low attitude by variation of forward and aft controls, plus an additional deflection of trailing edge controls 399 and 400. Numerous variations of forward wing outer and aft wing outer controls, set at different angles of incidence, with further adjustments by trailing edge controls 399 and 400 acting in unison or differentially, add an unlimited new scope of controls to this fighter airplane. Control surfaces 5 and 6 may then be operated as either rudders or as elevators, and since the operation of these functions does not interfere with each other, the movements may be composites of both operations. Furthermore, rudder control actions may be superimposed on elevator control actions, and elevator control may be superimposed on rudder control at any and at all times, and without the control of the one function washing out the control of the other function.

A modification to the above would be to have no connection between lever 421 and bracket 38, with bracket 38 fixed only to rotate in anchor plate 37. This would then permit only rudder actions of control surfaces 5 and 6. In like manner, to control surfaces 5 and 6, outer wing surfaces 357 and 358, may be operated at times as either ailerons or as elevators, and since the operation of these functions does not interfere with each other, the movements may be composites of both operations. Furthermore, aileron control actions may be superimposed on elevator control actions, and elevator control may be superimposed on aileron control at any and all times, and without the control of the one function washing out the control of the other function. In like manner, the above statement may be restated with reference to aft controls 397 and 398.

Pilot control column unit 385 may be moved to one side of the pilot, and attached to the fuselage structure, instead of the central location which is shown, and also as previously mentioned, fly-by-wire controls, feed and hands, may be used, and attached directly to the pilot's seat or capsule, which may then be free to have a capability to be adjusted by rotation, etc., in flight, by automatic controls (not shown) for the best pilot position for "G" force tolerance then prevailing.

Figure 32:
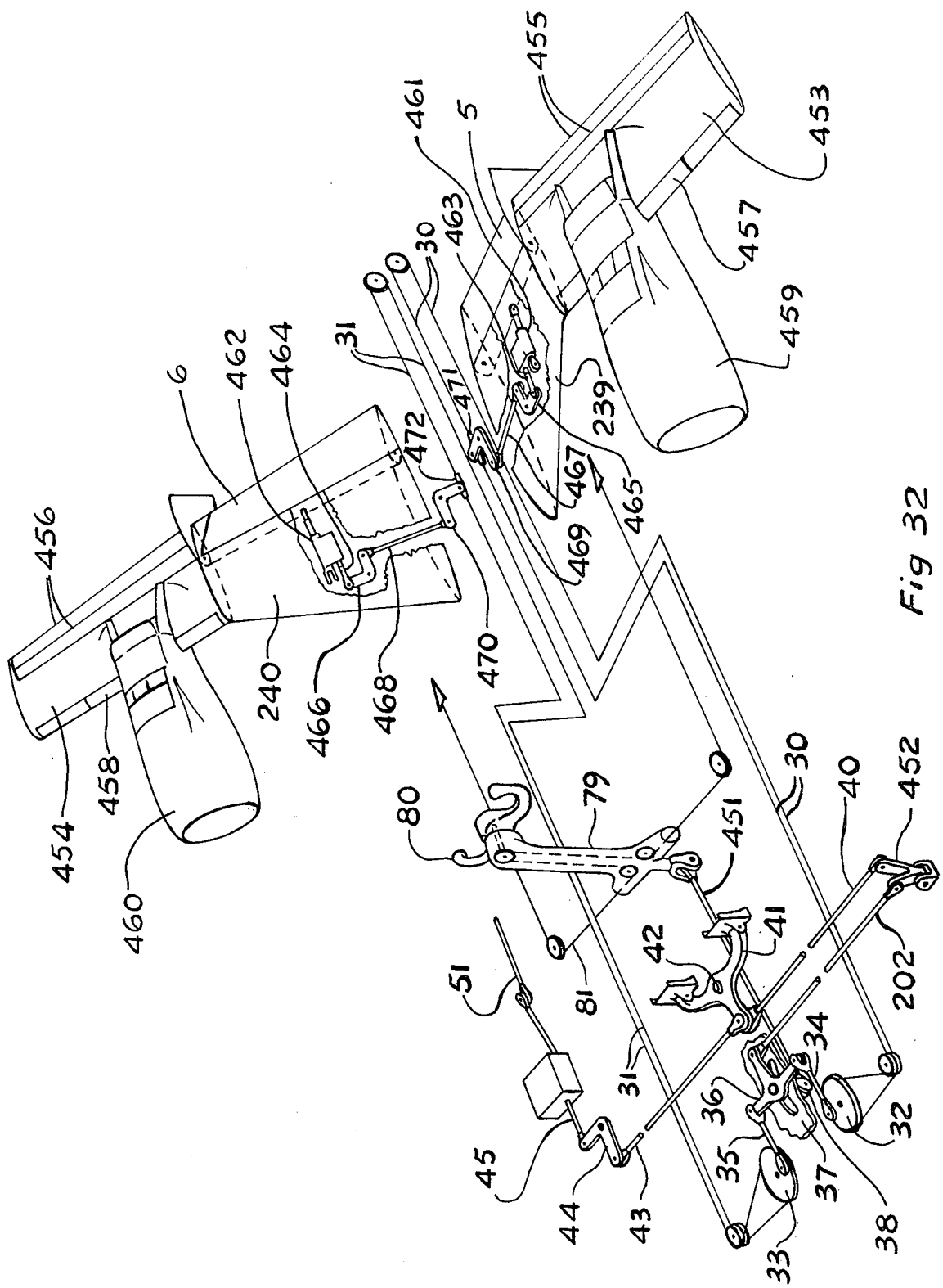

FIG. 32 shows forward lifting and controlling wing surfaces, with inboard dihedraled fins, and outer near-horizontal wing surfaces, similar to FIG. 27. Aft rudder control, which is the same as that detailed in FIG. 23, moves out from rudder bar 41 and then actuates push-pull rod 43, as previously detailed in FIG. 23. The main featured difference displayed in FIG. 32 is the addition of jet engines to the forward wing surfaces. For this particular version of engine mounted wing surfaces, two engines are shown, but four or more engines may be deployed. The total surfaces are fixed in this example, that is, no incidence change of inner dihedraled or outer near-horizontal surfaces are indicated. Elevation and depression by the forward surfaces is achieved by inner rudder or elevator up and down movement, plus outer, high lift flaps which feature over wing engine jet thrust and induced airflow, which follows the gentle contour change, multiple segmented, flapped upper surfaces (actuation means not shown). Leading edge, flow control surfaces also are shown to assist with the maximum total desirable chord-wise, outer wing airflow (actuation means not shown). The outer near-horizontal leading edge and trailing edge controls work in conjunction with the aft main wing controls (details not shown). This version of the patent is shown as a possible aircraft configuration in FIG. 7. Fixed dihedraled fins 239 and 240 are attached to the aircraft forward fuselage, and the outer wing surfaces 453 and 454, which further spread outboard close to the horizontal position which portions are attached to inboard dihedraled fins, via internal structure, and wing skins. Outer wing portions 453 and 454 have movable trailing edge controls 455 and 456 and also leading edge movable slats 457 and 458. Inner dihedraled wing portions 239 and 240 have trailing edge controls 5 and 6, which are hinged to move up and down by hydraulic actuators 461 and 462. Pilot control wheel 80 is part of control column 79 which can be moved fore and aft and by so doing gives movement to push-pull rod 451 which is attached to control column, lower attachment location. Push-pull rod 451 has its other end connected to bracket 38 which bracket moves oscillating bracket 36, in radiused slot, which slot is cut in plate 37, as previously detailed. Push-pull rods 34 and 35 are attached to oscillating bracket 36 and also control pivotally supported oscillating sheaves 32 and 33. Anchored to sheaves 32 and 33 are control cables 30 and 31 which are suitably positioned, by guide sheaves, about which cable is looped. Cables 30 and 31 have pivotal connections 471 and 472 attached. Bell crank levers 469 and 470 are pivotally supported, with one end of bell crank levers 469 and 470 attached to pivotal connections 471 and 472 and the other ends making connection with push-pull rods 467 and 468. Push-pull rods 467 and 468 in turn control pivotally supported bell cranks 465 and 466 to which they are also connected, which, when operated, give movement to control valves 463 and 464, which valves control hydraulic actuators 461 and 462.

The function of the parts numbered in the previous pages are now more fully described. In this particular version of the patent, when the pilot pulls control column 79, by control wheel 80, backwards, control rod 451 then slides bracket 36 forward, which action then via mechanism shown in FIG. 32 (see sketch) controls the trailing edge control surfaces 5 and 6 to move down about their hinges and give added lift to the forward control surfaces. With pilot control wheel 80 moved forward, a reversal of the above movements takes place, and the control surfaces 5 and 6 move up at the trailing edge and cause reduced lift at the forward surfaces. Rudder control is achieved as fully described in FIG. 23, including aft rudder control, when aft rudders are specified (duplicate of complete details in FIG. 23).

High-lift multiple segmented flaps 455 and 456 work in conjunction with leading edge flaps 457 and 458. Engines 459 and 460 have jet, and bypass outlet control doors (not detailed), which gases act with the ambient air to achieve high lift from the wing surfaces 453 and 454. Engine thrust reversal is also included (details not shown). The controls detailed above for surfaces 453 and 454 may be controlled differentially to work with aft main wing ailerons. The forward controls work at all times in conjunction with the aircraft main aft wing controls to form the total aircraft operating function (see FIG. 7).

A modification of the above gives the aircraft a vertical takeoff and landing capability, the forward wing surfaces being per FIG. 32, except that the outer wing portions 453 and 454, with engine or engines attached. Elevator portions pivot about a wing spar through approximately 90° at the join with the ruddered portion. The aft main wing with engines attached, moves simultaneously through approximately 90°, which then directs engine thrust downwardly from both forward and aft wings, to effect vertical takeoff and landing capability (not detailed).

Figure 33:
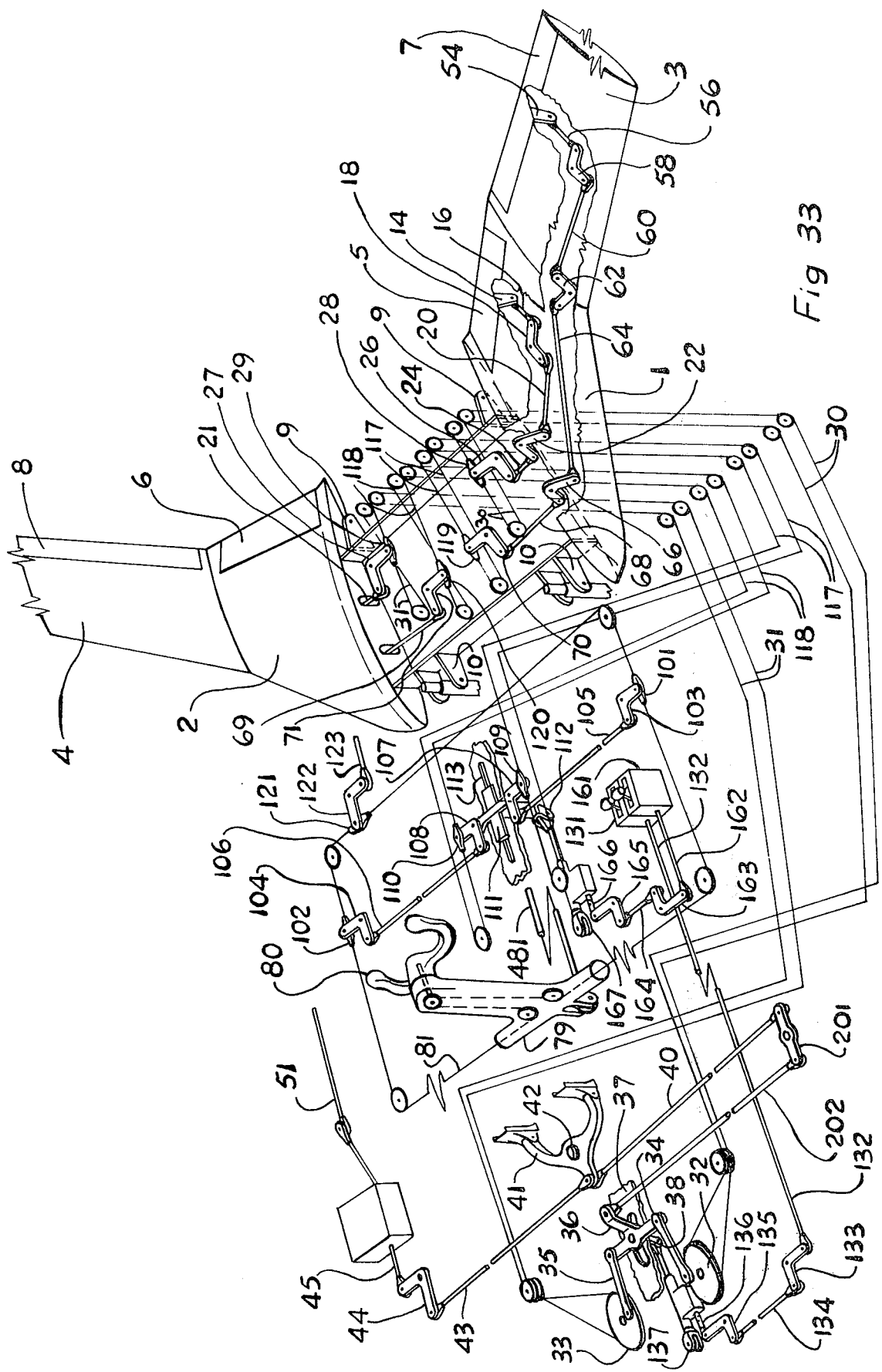

FIG. 33 shows forward lifting and controlling wing surfaces with a variable incidence capability, preferably controllable by the pilot, which control actuates the surfaces about hinge 9. FIG. 33 shows hinges at the rear with the incidence changing means forward. These components may be reversed. The arrangement shown is similar to FIG. 23 incidence changing mechanism. Aft rudder control, when required for a given design, is the same as that described for FIG. 23. The following details apply to the fixed and variable incidence versions. 1 and 2 are fins, set with an appropriate dihedral angle. Continuation of this description is the same as that found in FIG. 23, from rudders 5 and 6 through the operating mechanism to oscillating bracket 36. Rudder bar 41 connects with push-pull rod 43 per FIG. 23, while rudder bar 41 also makes a connection with push-pull rod 40, which also connects with pivotally supported lever 201, to which push-pull rod 202 is connected. Push-pull rod 202 also connects with oscillating bracket 36. Bracket 36 oscillates about bearing bracket 38, which bearing is contained in radiused slot of anchor plate 37. Attached to bracket 38 is operating arm of hydraulic cylinder 137 which is controlled by pilot hand control 131 as described in FIG. 25. The description of outer wing surfaces 3 and 4 with trailing edge movable control surfaces 7 and 8 is the same as FIG. 26. The control mechanism is the same from trailing edge control surfaces 7 and 8 to pivotally supported bell crank levers 70 and 71, per FIG. 23. Making connection with bell crank levers 70 and 71 are pivotal connections 119 and 120. The description of components from pivotal connections 119 and 120 to bracket 112 are per FIG. 24 description. Connection of hydraulic actuator 167 with bracket 112 on through pilot hand control 161 is per FIG. 26.

The function of the afore numbered parts are now fully described in the previous versions of the lifting, stabilizing and flight controlling wing surfaces. Elevator control was by the forward lifting surfaces, raising or lowering the aircraft nose, or by simultaneous elevation with the aft surfaces while in flight. In this FIG. 33, a change of control is employed. The forward surface trailing edge controls are set for takeoff and landing for high lift at low speed, the actual elevating control being performed by the aft placed main wing's trailing edge controls. Upon attaining a desired altitude and forward speed, the trailing edge controls on the forward surfaces may be neutralized for normal flight. The foot pedal for forward rudder controls remain active under all circumstances, and as suggested earlier, a rudder only alternate function may be employed on surfaces 5 and 6. This would entail fixing bearing bracket 38 and thereby removing all control mechanisms associated with the fore and aft movement of bracket 38 in curved slot, of plate 37. With this suggested variation, the control of surfaces 7 and 8 would remain unaltered.

When pilot control wheel 80 is pulled backwards, control push-pull rod 481 conveys this movement to the trailing edge control surfaces of the aft main plane and deflects the trailing edge surfaces as required, to give the best total lift combination of fore and aft lifting surfaces (details not shown). A forward movement of pilot control wheel 80 would give an opposite effect to the above. Pilot operation of foot pedal control 41, oscillating about pivotal bearing 42, is identical to that described in FIG. 23, including aft rudder control variation, if desired. Pilot hand controls 131 and 161 are actuated to give the desired, down rotation of forward trailing edge control surfaces 5, 6, 7 and 8 for high lift during takeoff and landing. Control surfaces 5, 6, 7 and 8 may also be raised to reduce lift in flight, alone or in conjunction with a similar main wing trailing edge control condition for a certain desirable form of aircraft descent. When pilot control wheel 80 is rotated, aileron control is initiated by the movement of cable 81 which cable moves aft along the airplane fuselage to control aft main plane aileron controls. Cable 81 also actuates control surfaces 7 and 8, which also become ailerons on the forward control surfaces, working simultaneously with the aft ailerons to give certain advantages which have been described earlier (see FIG. 24 description).

Figure 34:
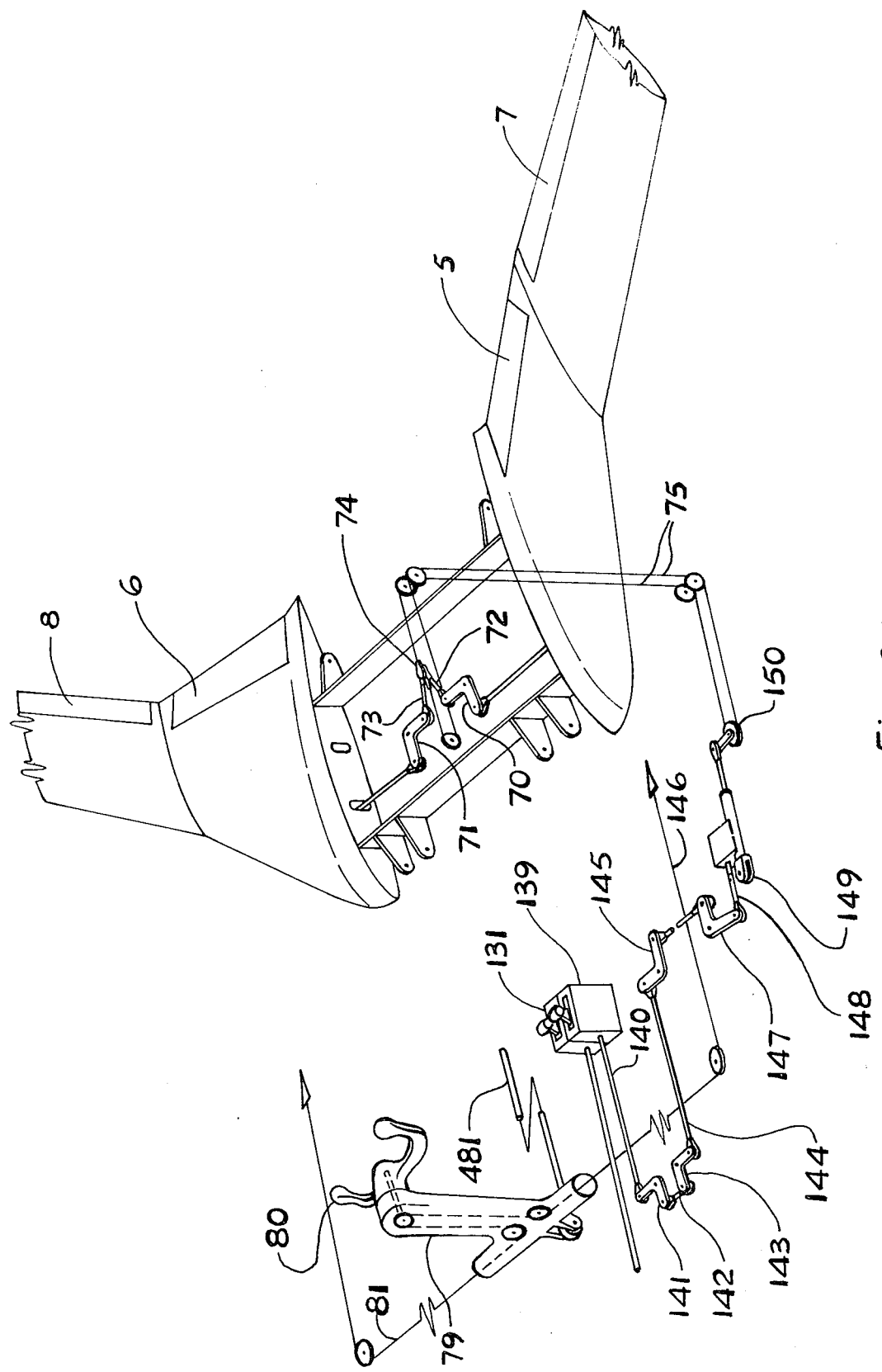

FIG. 34 is a modified version of FIG. 33. The inboard dihedraled fins, with the outboard attached horizontal fins, are unchanged, per FIG. 33. So also are the trailing edge control surfaces 5 and 6. The mechanism which actuates the aft rudders is also unchanged. This modification removes the forward aileron capability from control surfaces 7 and 8, which control surfaces then function simultaneously, as outer hinged flaps only. pilot hand control 139 replaces pilot hand control 161. This control actuates push-pull rod 140 and subsequent controls, to give desired trailing edge flap action, at control surfaces 7 and 8, which control means are fully described in FIG. 25.

FIGS. 35, 36 and 37 are shown to suggest three of any number of versions of dual pilot rudder foot controls. The corresponding dual pilot hand control wheels and columns are usually side-by-side units, duplicating through various connections and linkages, to move simultaneously, and they are not illustrated.

FIG. 35 shows dual rudder pedals 41, which pivot at bearing 42. Control link 491 pivotally connects both rudder pedals 41, to move simultaneously. Push-pull rod 492 pivotally connects with rudder pedal bracket 41, and pivotally connects with lever 494 which is pivotally supported. Push-pull rod 495 is also pivotally connected at its ends with lever 494 and oscillating control bracket 36, which may be fixed, or capable of sliding in slotted bracket 37. Control cables 30 and 31 have their intended functions conveyed up to oscillating bracket 36 per FIG. 23 description. Push-pull rod 493 pivotally connects with lever 494 and bell crank lever 44 and on per FIG. 23 description, of aft rudder control.

FIG. 36 shows modified version of rudder pedal brackets 41 with control link 491, per FIG. 35. Push-pull rod 496 pivotally interconnects with one rudder pedal bracket 41, and pivotally connects at its other end with oscillating control bracket 36. The remaining rudder pedal bracket 41 pivotally interconnects with push-pull rod 43, which pivotally connects with bell crank lever 44 and on per FIG. 23. Rudder movements are conveyed by push-pull rods 191 and 192, and are pivotally connected with levers 499 and 500, which are pivotally supported. Also attached to levers 499 and 500 are push-pull rods 497 and 498 which also make pivotal connections with each side of oscillating bracket 36.

FIG. 37 shows a departure with regard to the design of the dual rudder pedals. Foot pedals 503 make connections with hinged rods 504 which rods have levers 505 attached thereto. Pivotal connections 506 are attached to cable 507 and also levers 505. The cable 507 is suitably positioned by guide sheaves, about which the continuous cable is looped. Also connected to cable 507 by pivotal connection 506 is lever 508, pivotally supported. Also attached to lever 508 is push-pull rod 509 which pivotally connects with pivotally supported lever 494, to which push-pull rods 493 and 495 are also pivotally interconnected. Push-pull rod 493 connects also with bell crank lever 44, per FIG. 35, and push-pull rod 495 also is pivotally connected with oscillating bracket 36, which may be capable of sliding in slotted plate 37. Push-pull rods 191 and 192, pivotally connected to oscillating bracket 36, convey the intended rudder movements.

Many modifications of the foregoing may be designed, which, without departing from the scope of the invention, may be added to certain or all of the previously described embodiments. An example being to bridge across the elevator and rudder surfaces join, or fold line, on each side of the aircraft, thereby developing an additional lifting surface, which may be equipped with leading edge, and trailing edge, movable surfaces with variable incidence, as another example, and of any suitable plan form, to suit, and work with the forward lifting, and controlling surfaces, to which it would be added.

Another example being the removal of the elevating capability from the dihedraled or anhedraled rudders, by fixing the control pivot point, and removing the control rods and other actuating means, associated with this elevating function, and to have the dihedraled or anhedraled trailing edge control surfaces, perform a rudder function only.

Another example would be to have a fin rise vertically from the center line of the forward fuselage, which fin may, or may not, have a movable trailing edge rudder attached. Atop this fin may be secured any of the forward lifting and controlling wing surfaces, shown or referred to, in this patent. Jet engines may also be attached to this vertical fin. Further examples of the above may use the aft fuselage of an aircraft with the above mentioned vertical fin attached thereto. Atop this fin may be secured the dihedraled or anhedraled versions.

What I claim is:

1. Aircraft lifting and controlling wing surfaces, with movable trailing edges, along the spread of said wing, surfaces, said wing surfaces is a monoplane wing extending outboard, vertically and horizontally from the forward fuselage to which it is attached, on each side, forming the inner portions of the wing, which then spreads further outboard from the inner portions, on each side, to form the outer surfaces, at a horizontal, or near-horizontal condition, and thereby forms the complete wing surfaces, and by the innate lifting and stalling qualities, of this combination, gives a controlled total wing stalling condition, by the different stalling angles of attack of the inner and outer portions, of the total wing surfaces, which condition is accomplished by choosing the inner surfaces angle of dihedral, on each side of the fuselage, and also by choosing the span, or area of the inner and outer surfaces in relation to each other, where the ideal design condition, is that condition when the outer surfaces are induced to stall, and the inner surfaces, which stall at a greater angle of attack, then become much more heavily loaded, and gently reduce the total surfaces angle of attack, through the then, much increased inner portions wing loading, to a point where the outer portions of the total wing surfaces, again regain lift, and thus the inner portion of the wing surfaces, cannot be induced to stall, and by the large dihedral angle employed with the inner wing portion, a natural centering effect prevents the total surfaces from dropping a wing to one side, when the outer surfaces are induced to stall, and actuating levers for simultaneously moving, the total trailing edge control surfaces in an up and down direction, by controlling connections with the lower end of the pilot actuated control column, which connections control the outer trailing edge control surfaces, and by additional control connections, also attached to the lower end of the control column, which control the inner dihedraled, trailing edge control surfaces, and levers for moving the inner dehedraled trailing edge control surfaces in reverse operations, to each other by a foot controlled rudder bar, which is connected to a movably supported fulcrum, which in turn actuates the above mentioned levers, at any previously positioned, simultaneously controlled location, as this trailing edge reverse operation gives rudder control, and a means to contain inner dihedraled trailing edge control surfaces, from giving inadvertent rudder control, when only trailing edge up and down movement is desired, by a movably supported fulcrum, which slides in a radiused slot, suitably radiused relative to the rudder bar actuating rod length, and push-pull rods attached to each side of the movably supported, fulcrum, arranged to crank cable pulleys, which in turn give control actuation to the inner rudder, and/or inner elevator control surfaces, while a means whereby the rudder action being described, may be simultaneously controlled with additional rudders, placed at the opposite end of the aircraft, to the previously described rudders, which may be retractable, as these additional rudders, may be operated to give neutral or no movement, or like or opposite movement to each other, by a push-pull rod, which conveys rudder bar action to a pivoted bracket, which contains a radiused slot, and the pivotal center of the bracket is also in line with the mid-position of this slot, and as a pilot commanded control arm, selects the relative position of both sets of rudders, as previously described, by positioning one end of a push-pull rod, in the radiused slot, with the other end making a dual fulcrum location with an additional push-pull rod, which has the function of actuating the additional rudders, and as this dual fulcrumed bearing is free to slide in a straight cut slot, at right angles, and in line with the mid-point of the previously mentioned radiused slot, the radius of this slot being equal to the length of the push-pull rod which slides in the radius, and a means whereby the total control surfaces may be fixed, or be moved as a unit to give any desired forward plane angle of incidence change, by a suitable pilot type control handle means, as the total surfaces may be hinged with an actuator, suitably powered, to give the desired action.

2. Aircraft having a main wing with aileron controls, said aircraft further including lifting and controlling wing surfaces, with movable trailing edges, along the spread of said wing, surfaces, said wing surfaces is a monoplane wing extending outboard, vertically and horizontally from the forward fuselage to which it is attached, on each side, forming the inner portions of the wing, which then spreads further outboard from the inner portions, on each side, to form the outer surfaces, at a horizontal, or near-horizontal condition, and thereby forms the complete wing surfaces, and by the innate lifting and stalling qualities, of this combination, gives a controlled total wing stalling condition, by the different stalling angles of attack of the inner and outer portions, of the total wing surfaces, which condition is accomplished by choosing the inner surfaces angle of dihedral, on each side of the fuselage, and also by choosing the span, or area of the inner and outer surfaces in relation to each other, where the ideal design condition, is that condition when the outer surfaces are induced to stall, and the inner surfaces, which stall at a greater angle of attack, then become much more heavily loaded, and gently reduce the total surfaces angle of attack, through the then, much increased inner portions wing loading, to a point where the outer portions of the total wing surfaces, again regain lift, and thus the inner portion of the wing surfaces, cannot be induced to stall, and by the large dihedral angle employed with the inner wing portion, a natural centering effect prevents the total surfaces from dropping a wing to one side, when the outer surfaces are induced to stall, and actuating levers for simultaneously moving, the total trailing edge control surfaces in an up and down direction, by control connections with the lower end of the pilot actuated control column, which connections control the outer trailing edge control surfaces, and by additional control connections, also attached to the lower end of the control column, which control the inner dihedraled, trailing edge control surfaces and levers for moving the inner dihedraled trailing edge control surfaces in reverse operations, to each other, by a foot controlled rudder bar, which is connected to a movably supported fulcrum, which in turn actuates the above mentioned levers, at any previously positioned, simultaneously controlled location, as this trailing edge reverse operation gives rudder control, in addition, a means of actuation is provided whereby the outer, horizontal trailing edge control surfaces on each side of the fuselage, may be moved in opposite direction, to each other, at any previously positioned, total surfaces movement, or any dihedraled rudder trailing edge control location, and this aileron type control is added by making a connection with the pilot's control wheel, actuating the main wing aileron controls, which utilize control linkages, and a movable, sliding control bracket, permitting these simultaneous, movements, in conjunction with the main wing ailerons, method of control, and a means to contain the dihedraled trailing edge control surfaces, from giving inadvertent rudder control when only trailing edge up and down movement is desired, by a movably supported fulcrum, which slides in a radiused slot, suitably radiused, relative to the rudder bar actuating rod length, and push-pull rods attached to each side of the movably supported fulcrum, are arranged to crank, cable pulleys which in turn give control actuation to the inner rudder, and/or inner elevator, control surfaces, while a means whereby the rudder action being described, may be simultaneously controlled with additional rudders, placed at the opposite end of the aircraft, to the previously described rudders, which may be retractable, as these additional rudders may be operated to give neutral, or no movement, or like or opposite movement to each other, by a push-pull rod which conveys rudder bar action to a pivoted bracket, which contains a radiused slot, and the pivotal center of the bracket is also in line with the mid-position of this slot, and as a pilot commanded control arm, selects the relative position of both sets of rudders as previously described, by positioning one end of a push-pull rod in the radiused slot, with the other end making a dual fulcrum location, with an additional push-pull rod, which has the function of actuating the additional rudders, and as this dual fulcrumed bearing is free to slide in a straight cut slot, at right angles, and in line with the mid-point of the previously mentioned radiused slot, the radius of this slot being equal to the length of the push-pull rod which slides in the radius, and a means whereby the total control surfaces, may be fixed, or be moved as a unit to give any desired forward plane angle of incidence change, by a suitable pilot type control handle means, as the total surfaces may be hinged with an actuator, suitably powered, to give the desired actuation.

3. Aircraft lifting and controlling wing surfaces, with movable trailing edges, along the spread of said wing, surfaces, said wing surfaces is a monoplane wing extending outboard, vertically and horizontally from the forward fuselage to which it is attached, on each side, forming the inner portions of the wing, which then spreads further outboard from the inner portions, on each side, to form the outer surfaces, at a horizontal, or near-horizontal condition, and thereby forms the complete wing surfaces, and by the innate lifting and stalling qualities, of this combination, gives a controlled total wing stalling condition, by the different stalling angles of attack of the inner and outer portions, of the total wing surfaces, which condition is accomplished by choosing the inner surfaces angle of dihedral, on each side of the fuselage, and also by choosing the span, or area of the inner and outer surfaces in relation to each other, where the ideal design condition, is that condition when the outer surfaces are induced to stall, and the inner surfaces, which stall at a greater angle of attack, then become much more heavily loaded, and gently reduce the total surfaces angle of attack, through the then, much increased inner portions wing loading, to a point where the outer portions of the total wing surfaces, again regain lift, and thus the inner portion of the wing surfaces, cannot be induced to stall, and by the large dihedral angle employed with the inner wing portion, a natural centering effect prevents the total surfaces from dropping a wing to one side, When the outer surfaces are induced to stall, and a means whereby the total wing surfaces are hinged, and actuated by suitable control units, to give, total wing surfaces angle of attack changes, by direct pilot, actuated fore and aft, control column movements, and the hinges may be placed at one chordwise end of the wind with the actuation means at the other end, and levers for moving the inner dihedral trailing edge control surfaces in reverse operations to each other, by a foot controlled rudder bar, which is connected to a movably supported fulcrum, which in turn actuates aforementioned levers, and additional independent pilot actuated hand controls, permits simultaneous up or down movement to the other horizontal trailing edge control surfaces, on each side of the fuselage, and also simultaneous up and down actuation to the dihedraled rudder trailing edge control surfaces, regardless of the rudder location, then employed, and a means to contain inner dehedraled trailing edge control surfaces, from giving inadvertent rudder control when only trailing edge up and down movement is desired, by a movably supported fulcrum, which slides in a radiused slot, suitably radiused relative to the rudder bar actuating rod length, and push-pull rods attached to each side of the movably supported fulcrum, are arranged to crank cable pulleys, which in turn give control actuation to the inner rudder and/or inner elevator, control surfaces, while a means whereby the rudder action being described may be simultaneously controlled with additional rudders, placed at the opposite end of the aircraft, to the previously described rudders, which may be retractable, as these additional rudders may be operated to give neutral or no movement, or like or opposite movement to each other, by a push-pull rod which conveys rudder bar action to a pivoted bracket, which contains a radiused slot and the pivotal center of the bracket is also in line with the mid-position of this slot, and as a pilot commanded control arm, selects the relative position of both sets of rudders, as previously described, by positioning one end of a push-pull rod, in the radiused slot, with the other end making a dual fulcrum location, with an additional push-pull rod, which has the function of actuating, the additional rudders, and as this dual fulcrumed bearing is free to slide in a straight cut slot, at right angles, and in line with the mid-point of the previously mentioned radiused slot, the radius of this slot being equal to the length of the push-pull rod which slides in the radius.

4. Aircraft have a main wing with aileron controls, said aircraft further including lifting and controlling wing surfaces, with movable trailing edges, along the spread of said wing, surfaces, said wing surfaces is a monoplane wing extending outboard, vertically and horizontally from the forward fuselage to which it is attached, on each side, forming the inner portions of the wing, which then spreads further outboard from the inner portions, on each side, to form the outer surfaces, at a horizontal, or near-horizontal condition, and thereby forms the complete wing surfaces, and by the innate lifting and stalling qualities, of this combination, gives a controlled total wing stalling condition, by the different stalling angles of attack of the inner and outer portions, of the total wing surfaces, which condition is accomplished by choosing the inner surfaces angle of dihedral, on each side of the fuselage, and also by choosing the span, or area of the inner and outer surfaces in relation to each other, where the ideal design condition, is that condition when the outer surfaces are induced to stall, and the inner surfaces, which stall at a greater angle of attack, then become much more heavily loaded, and gently reduce the total surfaces angle of attack, through the then, much increased inner portions wing loading, to a point where the outer portions of the total wing surfaces, again regain lift, and thus the inner portion of the wing surfaces, cannot be induced to stall, and by the large dihedral angle employed with the inner wing portion, a natural centering effect prevents the total surfaces from dropping a wing to one side, when the outer surfaces are induced to stall, and a means whereby the total wing surfaces are hinged, and actuated by suitable control units, to give total wing surfaces angle of attack changes, by direct pilot, actuated fore and aft, control column movements, and levers for moving the inner dihedral trailing edge control surfaces in reverse operations to each other, by a foot controlled rudder bar, which is connected to a movably supported fulcrum, which in turn actuates the aforementioned levers, and additional independent pilot actuated hand controls, permits simultaneous up or down movement to the outer horizontal trailing edge control surfaces, on each side of the fuselage, and also simultaneous up and down actuation to the dihedraled rudder trailing edge control surfaces, regardless of the rudder location, then employed, and in addition, a means of actuation is provided whereby the outer horizontal trailing edge control surfaces on each side of the fuselage, may be moved in opposite directions, to each other, at any previously positioned, total surfaces movement, or any dihedraled rudder trailing edge control location, and this aileron type control is added by making a connection with the pilot's control wheel, actuating the main wing aileron controls, which utilize control linkages, and a movable, sliding control bracket, permitting these simultaneous movements, in conjunction with the main wing ailerons means of control, and a means to contain inner dihedraled trailing edge control surfaces, from giving inadvertent rudder control, when only trailing edge up and down movement is desired, by a movably supported fulcrum, which slides in a radiused slot suitably radiused, relative to the rudder bar actuating rod length, and push-pull rods attached to each side of the movably supported fulcrum, arranged to crank cable pulleys, which in turn give control actuation to the inner rudder, and/or inner elevator, control surfaces, while a means whereby the rudder action being described may be simultaneously controlled with additional rudders, placed at the opposite end of the aircraft, to the previously described rudders, which may be retractable, as these additional rudders may be operated to give neutral or no movement, or like or opposite movement, to each other, by a push-pull rod, which conveys rudder bar action, to a pivoted bracket, which contains a radiused slot, and the pivotal center of the bracket is also in line with the mid-position of this slot, and as a pilot commanded control arm, selects the relative position of both sets of rudders, as previously described, by positioning one end of a push-pull rod, in the radiused slot, with the other end making dual fulcrumed location, with an additional push-pull rod, which has the function of actuating, the additional rudders, and as this dual fulcrumed bearing is free to slide in a straight cut slot, at right angles, and in line with the mid-point of the previously mentioned radiused slot, the radius of this slot being equal to the length, of the push-pull rod which slides in the radius.

5. Aircraft lifting and controlling wing surfaces, having a monoplane wing extend outboard, vertically and horizontally, from the fuselage to which it is attached, one each side, to provide a dihedraled condition, forming the inner portions of the wing, and spreading outboard further on each side from this inner wing, at a horizontal, or near-horizontal condition, are additional wing portions which are built around a suitable wing spar bearing, which provides a capability to carry these outer wing surfaces, and also make these outer portions have a simultaneous, variable incidence capability by separate pilot hand control action, while simultaneously movable trailing edge surfaces, are provided for aircraft elevation control, by direct pilot actuation of the control column, which movable trailing edge surfaces moving differentially are provided on the fixed inner portions to provide rudder control, by rudder bar actuation, and also, these fixed inner portions have additional elevator control, by a separate pilot hand control action, and by selecting inner and outer surface areas, with a relationship to each other, so that the outer wing surfaces stalling, will then be assured before the inner dihedraled wing surfaces may stall, and a means whereby elevation control, may be applied to the inner rudders, without inducing an inadvertent rudder control, and also additional rudder means, placed at the opposite end of the aircraft may be actuated, with the rudders being described.

6. Aircraft having a main wing with aileron controls, said aircraft further including lifting and controlling wing surfaces, having a monoplane wing extend outboard, vertically and horizontally from the fuselage to which it is attached, on each side, to provide a dihedraled condition, forming the inner portions of the wing, and spreading outboard further on each side from the inner wing, at a horizontal or near-horizontal condition, are additional wing portions, which are built around a suitable wing spar bearing, which provides a capability to carry these outer wing surfaces, and also make these outer portions, have a simultaneous, variable incidence capability, by separate pilot hand control action, while simultaneously movable trailing edge surfaces are provided for aircraft elevation control, by direct pilot actuation of the control column, and in addition, by pilot control wheel rotation, a means of actuation is provided whereby the outer, horizontal trailing edge control surfaces on each side of the fuselage, may be moved in opposite directions, to each other at any previously positioned, elevator location to give aileron control, to assist with the main wing aileron control action, while movable trailing edge surfaces moving differentially are provided on the fixed inner portions to provide rudder control, by rudder bar actuation, and also these fixed inner portions have additional elevator control by a separate pilot hand control action, and by selecting inner and outer surface areas, with a relationship to each other so that the outer wing surfaces stalling will then be assured before the inner dihedraled wing surfaces may stall, and a means whereby elevation control may be applied to the inner rudders, without inducing an inadvertent rudder control, and also additional rudder means, placed at the opposite end of the aircraft may be actuated with the rudders being described.

7. Aircraft lifting and controlling wing surfaces, having a monoplane wing extend outboard vertically and horizontally, from the fuselage to which it is attached on each side, to provide a dihedraled condition, forming the inner portions of the wing, and spreading outboard further on each side from this inner wing, at a horizontal condition, are additional wing portions which move simultaneously, and are built around a suitable wing spar bearing, which provides a capability to carry the wing surface, and also make these outer portions have a direct angle of attack change, by direct pilot actuated, fore and aft column movements, and inner trailing edge rudder controls move differentially, by pilot rudder bar actuation, while rudder and outer elevator trailing edge controls, may have additional elevator control movements, applied by further pilot operated individual hand controls, and by selecting inner, and outer surfaces areas, with a restriction placed on the outer wing angle of incidence movement, and trailing edge movement, outer wing stalling will then be assured, before inner wing surfaces will stall, and a means whereby elevation may be applied, to the inner rudders, without inducing inadvertent rudder control, also additional rudder, means, placed at the opposite end of the aircraft, may be actuated with the rudders being described above.

8. Aircraft having a main wing with aileron controls, said aircraft further including lifting and controlling wing surfaces, having a monoplane wing extend outboard vertically and horizontally, from the fuselage to which it is attached on each side, to provide a dihedraled condition, forming the inner portions of the wing, and spreading outboard further on each side from this inner wing, at a horizontal, or near-horizontal condition, are additional wing portions which move simultaneously, and built around a suitable wing spar bearing, which provides a capability to carry the wing surface, and also make these outer portions, have a direct angle of attack change, by direct pilot actuated, fore and aft, control column movements, and inner trailing edge rudder controls, move differentially, by pilot rudder bar actuation, while rudder and outer elevator trailing edge controls, may have additional elevator control movements applied, by further pilot operated individual hand controls, and in addition by pilot control wheel, rotation, a means of actuation is provided, whereby the outer horizontal trailing edge control surfaces, may be moved in opposite directions, to each other, at any previously positioned, elevator location, to give aileron control, to assist with the main wing aileron control action, and by selecting inner, and outer surfaces areas, with a restriction placed on the outer wing angle of incidence movement, and trailing edge movement, outer wing stalling will then be assured before inner wing surfaces may stall, and a means whereby elevation control may be applied to the inner rudders, without inducing inadvertent rudder control, and also additional rudder means placed at the opposite end of the aircraft may be actuated with the rudders being described above.

9. Aircraft lifting and controlling wing surfaces, having a monoplane wing extend outboard vertically and horizontally, from the forward fuselage to which it is attached on each side to provide a dihedraled condition, and equipped with trailing edge controls, forming the inner, fixed portions of the wing, and spreading outboard further on each side from this inner wing, at a horizontal, or near-horizontal condition, are additional wing portions which are built around a suitable wing spar and bearing, which provides a capability to carry these outer wing surfaces, and also make these outer portions capable of simultaneous and differential movements, by pilot control column movements, to provide forward elevator and aileron control, and in addition the control column movement also moves the forward inner dihedraled, trailing edge, dual functioned controls for additional forward elevator control, and these inner dihedraled trailing edge controls also provide forward rudder control by differential trailing edge movements controlled by the pilot operated rudder foot control, and these dual functions may be superimposed on each other at any time, and by selecting inner and outer surfaces areas, with relationship to each other, so that the outer wing surfaces stalling, will then be assured before the inner wing dihedraled surfaces, may stall, and a means whereby elevation control, may be applied to the inner rudders, without inducing inadvertent rudder control, and also additional rudder means placed at the aft end of the aircraft may be actuated with the forward rudders being described.

10. Aircraft having an aft main wing with trailing edge control surfaces and ailerons, said aircraft further including lifting and controlling wing surfaces, having a forward monoplane wing extend outboard vertically and horizontally from the fuselage to which it is attached, on each side, to provide a dihedraled condition, forming the inner portions of the wing and spreading outboard further on each side from this inner wing, at a horizontal, or near-horizontal condition, are additional wing portions which are fixed to the inner wing, and also attached to these fixed outer wing portions, are jet engines, and the inner dihedraled wing portions, have trailing edge flaps, which operate as elevators or rudders, or simultaneously perform both functions, while the outer wing portions have leading edge and trailing edge high lift flaps, which may be programmed to work with aft wing controls, and fore and aft movement on the pilot's control column, operates the inner dihedraled trailing edge surfaces, for elevator control, while the pilot operated rudder bar, gives differential, or rudder control, to these same trailing edge controls, and each operation may be superimposed on each other, and additionally, the area of the outer wing, with its leading edge, and trailing edge controls, is such that the forwrd total wing surface, may be induced to stall, which action is to designed, that the outer horizontal wing portions will stall, without the inner dihedraled portions stalling, which then gently returns the total surfaces to a normal lifting attitude, and also designed into these control mechanisms, is a means whereby elevator control may be applied to the inner rudders without inducing inadvertent rudder control, and also additional rudder means placed at the rear of the aircraft may be actuated, with the rudders being described above.

11. Aircraft having an aft main wing with trailing edge control surfaces and ailerons, said aircraft further including lifting and controlling wing surfaces, having a forward monoplane wing extend outboard vertically and horizontally from the forward fuselage, to which it is attached, on each side, to provide a dihedraled condition, forming the inner wing portions of the total wing, and spreading outboard further on each side from this inner wing, at a horizontal, or near-horizontal condition, are additional wing portions, which are fixed to the outer edge of the inner wing, and thereby form the complete forward wing surfaces, and the total forward wing surfaces trailing edges, form movable control surfaces, while pilot actuation of the control column in a fore and aft direction actuates the aircraft's aft, main wing trailing edge surfaces, for direct elevation control, the trailing edge surfaces of the forward surfaces, are set for takeoff and landing, by pilot actuated hand controls, to give down deflection on these trailing edge surfaces, with one hand control, actuating the inner dihedraled trailing edges, while another hand control alongside, controls the outer horizontal surfaces trailing edges, and these controls may be actuated in unison or one or the other, may be used separately, while the rudder pedals control the inner dihedraled trailing edge surfaces differentially, for rudder control, with an additional control linkage, giving aft placed rudder actuation, the dual function of the inner dihedraled, trailing edge controls, may be superimposed on each other without nullifying the effect on the one control action, by the action of the other, and additionally the area of the outer wing portion, is such that the forward total wing surfaces, may be induced to stall, which action is so designed, that the outer horizontal wing portions will stall, without the inner dihedraled portions stalling, which action then gently returns the total surfaces to a normal lifting attitude, and also designed into these control mechanisms, is a means whereby, up and down deflection, may be applied to the inner rudders, without inducing inadvertent rudder control, and the pilot control wheel movement by rotation, controls the main aft wing ailerons, and also controls the forward outer horizontal portions, outer trailing edge surface controls, simultaneously, by applying additional aileron control, to the forward lifting surfaces, and this action gives a dual function to these outer trailing edge surfaces, and the aileron control may be applied at any trailing edge position, without affecting the intended previous control setting, and a means whereby the total control surfaces, may be fixed, or be moved as a unit, to give any desired forward plane, angle of incidence change, by a suitable pilot type control handle means, as the total surfaces may be hinged, with an actuator, suitably powered, to give the desired actuation.

12. Aircraft having an aft main wing with trailing edge control surfaces and ailerons, said aircraft further including lifting and controlling wing surfaces, having a forward monoplane wing extend outboard vertically and horizontally from the forward fuselage, to which it is attached, on each side, to provide a dihedraled condition, forming the inner wing portions of the total wing, and spreading outboard further on each side from this inner wing, at a horizontal, or near-horizontal condition, are additional wing portions, which are fixed to the outer edge of the inner wing, and thereby form the complete wing surfaces, and the total wing surfaces trailing edges, form movable control surfaces, while pilot actuation of the control column in a fore and aft direction actuates the aircraft's aft, main wing trailing edge surfaces, for direct elevation control, the trailing edge surfaces of the forward surfaces, are set for take-off and landing, by pilot actuated hand controls, to give down deflection on these trailing edge surfaces, with one hand control, actuating the inner dihedraled trailing edges, while another hand control alongside, controls the outer horizontal surfaces trailing edges, and these controls may be actuated in unison or one or the other, may be used separately, while the rudder pedals control the inner dihedraled trailing edge surfaces differentially, for rudder control, with an additional control linkage, giving aft placed rudder actuation, the dual function of the inner dihedraled, trailing edge controls, may be superimposed on each other without nullifying the effect of the one control action, by the action of the other, and additionally the area of the outer wing portion, is such that the forward total wing surfaces, may be induced to stall, which action is so designed, that the outer horizontal wing portions will stall, without the inner dihedraled portions stalling, which action then gently returns the total surfaces to a normal lifting attitude, and also designed into these control mechanisms, is a means whereby, up and down deflection, may be applied to the inner rudders, without inducing inadvertent rudder control, and the pilot control wheel movement by rotation, controls the main aft wing ailerons, and a means whereby the total control surfaces, may be fixed, or be moved as a unit, to give any desired forward plane, angle of incidence change, by a suitable pilot type control handle means, as the total surfaces may be hinged with an actuator, suitably powered, to give the desired actuation.

* * * * *